United States Patent
Santo et al.

(10) Patent No.: US 11,836,456 B2
(45) Date of Patent: *Dec. 5, 2023

(54) MACHINE TRANSLATION OF CHAT SESSIONS

(71) Applicant: ServiceNow, Inc., Santa Clara, CA (US)

(72) Inventors: Samantha Santo, San Diego, CA (US); Jebakumar Mathuram Santhosam Swvigaradoss, Hyderabad (IN); Ankit Goel, Hyderabad (IN); Prashant Pandey, Hyderabad (IN); John Botica, San Diego, CA (US); Rajesh Voleti, Hyderabad (IN); Laxmi Prasanna Mustala, Karimnagar (IN); Rishabh Verma, Hyderabad (IN); Satya Sarika Sunkara, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,717

(22) Filed: Dec. 19, 2022

(65) Prior Publication Data

US 2023/0122341 A1   Apr. 20, 2023

Related U.S. Application Data

(63) Continuation of application No. 17/153,144, filed on Jan. 20, 2021, now Pat. No. 11,580,312, which is a (Continued)

(51) Int. Cl.
*G06F 40/58* (2020.01)
*G06F 40/103* (2020.01)
(Continued)

(52) U.S. Cl.
CPC ............ *G06F 40/58* (2020.01); *G06F 3/0482* (2013.01); *G06F 16/335* (2019.01); *G06F 16/3337* (2019.01); *G06F 40/103* (2020.01)

(58) Field of Classification Search
CPC .... G06F 40/58; G06F 3/0482; G06F 16/3337; G06F 16/335; G06F 40/103; G06F 40/284; G06F 40/35; G06F 40/40
See application file for complete search history.

(56) References Cited

U.S. PATENT DOCUMENTS 5,987,402 A    11/1999   Murata et al.
6,609,122 B1    8/2003   Ensor
(Continued)

OTHER PUBLICATIONS

Wikipedia, Google Translate, downloaded from https://en.wikipedia.org/wiki/Google_Translate on Mar. 11, 2020.

*Primary Examiner* — Hassan Mrabi
(74) *Attorney, Agent, or Firm* — McDonnell Boehnen Hulbert & Berghoff LLP

(57) ABSTRACT

An embodiment may involve a database containing a first user profile that specifies a first preferred language of a first user and a second user profile that specifies a second preferred language of a second user. The embodiment may also involve one or more processors configured to: receive, from the first user and within a chat session, a first set of messages in the first preferred language; cause the first set of messages to be translated into the second preferred language; provide, to the second user and within the chat session, the first set of messages as translated; receive, from the second user and within the chat session, a second set of messages in the second preferred language; cause the second set of messages to be translated into the first preferred language; and provide, to the first user and within the chat session, the second set of messages as translated.

20 Claims, 24 Drawing Sheets

Related U.S. Application Data continuation-in-part of application No. 16/820,473, filed on Mar. 16, 2020, now Pat. No. 11,385,916.

(51) Int. Cl.
*G06F 3/0482* (2013.01)
*G06F 16/33* (2019.01)
*G06F 16/335* (2019.01)

(56) References Cited

U.S. PATENT DOCUMENTS

| | | |
|---|---|---|
| 6,678,887 B1 | 1/2004 | Hallman |
| 6,816,898 B1 | 11/2004 | Scarpelli |
| 7,020,706 B2 | 3/2006 | Cates |
| 7,028,301 B2 | 4/2006 | Ding |
| 7,062,863 B2 | 6/2006 | Warpenburg |
| 7,131,037 B1 | 10/2006 | LeFaive |
| 7,170,864 B2 | 1/2007 | Matharu |
| 7,254,527 B2 | 8/2007 | Xun |
| 7,350,209 B2 | 3/2008 | Shum |
| 7,610,278 B2 | 10/2009 | Su et al. |
| 7,610,512 B2 | 10/2009 | Gerber |
| 7,617,073 B2 | 11/2009 | Trinon |
| 7,689,628 B2 | 3/2010 | Garg |
| 7,713,038 B2 | 5/2010 | Flanagan et al. |
| 7,716,353 B2 | 5/2010 | Golovinsky |
| 7,734,458 B1 | 6/2010 | Eguchi et al. |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,683 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,201,870 B2 | 12/2015 | Jurach, Jr. |
| 9,239,857 B2 | 1/2016 | Trinon |
| 9,280,753 B2 * | 3/2016 | Wilson .............. G06F 40/58 |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,594,750 B1 | 3/2017 | Pearson et al. |
| 9,645,833 B2 | 5/2017 | Mueller |
| 9,654,473 B2 | 5/2017 | Miller |
| 9,766,935 B2 | 9/2017 | Kelkar |
| 9,785,632 B1 | 10/2017 | Beaven et al. |
| 9,792,387 B2 | 10/2017 | George |
| 9,805,322 B2 | 10/2017 | Kelkar |
| 9,819,729 B2 | 11/2017 | Moon |
| 9,858,258 B1 | 1/2018 | Pasquini |
| 10,650,103 B2 | 5/2020 | Leydon et al. |
| 10,936,635 B2 | 3/2021 | Kumbhar et al. |
| 2002/0123879 A1 | 9/2002 | Spector |
| 2002/0169592 A1 | 11/2002 | Aityan |
| 2003/0040900 A1 | 2/2003 | D'Agostini |
| 2003/0187800 A1 * | 10/2003 | Moore .............. G06F 40/40 379/114.03 |
| 2003/0200505 A1 | 10/2003 | Evans |
| 2004/0254783 A1 | 12/2004 | Isahara |
| 2006/0136223 A1 | 6/2006 | Brun et al. |
| 2006/0294463 A1 | 12/2006 | Chu et al. |
| 2007/0250306 A1 | 10/2007 | Marcu et al. |
| 2008/0177528 A1 | 7/2008 | Drewes |
| 2008/0244740 A1 | 10/2008 | Hicks et al. |
| 2009/0281790 A1 | 11/2009 | Travieso |
| 2010/0138211 A1 | 6/2010 | Shi et al. |
| 2010/0293230 A1 * | 11/2010 | Lai .............. G06F 40/58 709/227 |
| 2011/0134910 A1 | 6/2011 | Chao-Suren et al. |
| 2013/0060559 A1 * | 3/2013 | Ryu .............. G06F 40/58 704/3 |
| 2013/0111460 A1 | 5/2013 | Mohamed et al. |
| 2013/0211817 A1 | 8/2013 | Travieso et al. |
| 2013/0226896 A1 | 8/2013 | Chin et al. |
| 2014/0123039 A1 | 5/2014 | Ozer et al. |
| 2014/0288918 A1 * | 9/2014 | Orsini .............. G06F 40/58 704/2 |
| 2014/0303959 A1 * | 10/2014 | Orsini .............. G06Q 10/107 704/2 |
| 2014/0303960 A1 * | 10/2014 | Orsini .............. G06Q 30/0217 704/2 |
| 2014/0303961 A1 * | 10/2014 | Leydon .............. G06F 40/51 704/2 |
| 2015/0154183 A1 * | 6/2015 | Kristjansson .............. H04N 7/15 704/E13.001 |
| 2016/0352674 A1 * | 12/2016 | Strom .............. G06F 40/58 |
| 2017/0147558 A1 | 5/2017 | Kim et al. |
| 2018/0113859 A1 | 4/2018 | Kodimer |
| 2019/0050913 A1 | 2/2019 | Liu et al. |
| 2019/0056908 A1 | 2/2019 | Zabetian |
| 2019/0213915 A1 | 7/2019 | Tan |
| 2019/0332677 A1 | 10/2019 | Farhan et al. |
| 2020/0117713 A1 | 4/2020 | Ray et al. |
| 2020/0334411 A1 | 10/2020 | Patel et al. |
| 2021/0055942 A1 | 2/2021 | Guda |
| 2021/0064828 A1 | 3/2021 | Johnson Premkumar et al. |
| 2021/0124479 A1 | 4/2021 | Atieh |

\* cited by examiner

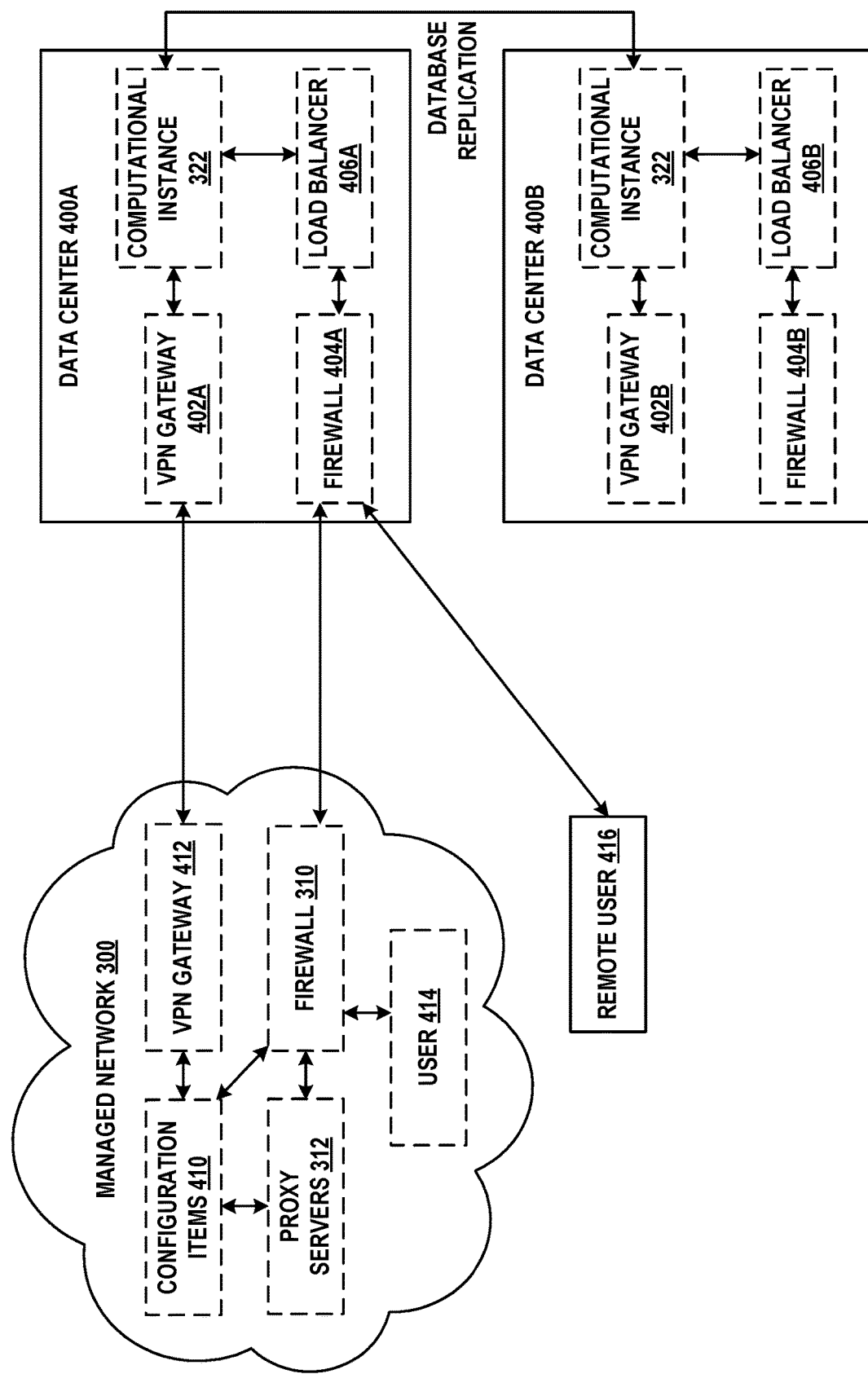

600

| ORIGINATOR | BOB SMITH | ← 602 |
|---|---|---|
| CREATED | 2018-02-07 9:56AM | ← 604 |
| SHORT DESCRIPTION | CAN'T CONNECT TO EMAIL | ← 605 |
| DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | ← 606 |
| CATEGORY | EMAIL | ← 608 |
| ASSIGNED TO | ALICE JONES | ← 610 |
| STATUS | RESOLVED | ← 612 |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | ← 614 |
| RESOLVED TIME | 2018-02-07 10:10AM | ← 616 |
| CLOSURE CODE | SOLVED (PERMANENTLY) | ← 618 |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | ← 620 |
| LINK TO KNOWLEDGEBASE | ITKB/WIRELESS/CONFIGURATION.HTML | ← 622 |

FIG. 6A

| SENDER | RECIPIENT | TIME | CONTENT |
|---|---|---|---|
| ALICE | BOB | 2019-08-11:09:23:05 | HI, I WOULD LIKE TO ORDER A NEW LAPTOP |
| BOB | ALICE | 2019-08-11:09:23:12 | THANKS FOR YOUR REQUEST, ALICE! I WILL BE HAPPY TO HELP YOU ORDER A NEW LAPTOP. DO YOU WISH TO STAY WITH YOUR CURRENT OPERATING SYSTEM OR TRY A NEW ONE? |
| ALICE | BOB | 2019-08-11:09:35:51 | I THINK I'D PREFER TO STAY WITH WINDOWS |
| BOB | ALICE | 2019-08-11:09:36:10 | OK, SOUNDS GOOD. WE HAVE THREE OPTIONS IN TERMS OF SCREEN SIZE AND MEMORY: 13" WITH 4GB OF RAM, 15" WITH 6GB OF RAM, AND 17" WITH 8GB OF RAM. |
| ALICE | BOB | 2019-08-11:09:38:27 | I'LL TAKE THE MIDDLE OPTION |
| BOB | ALICE | 2019-08-11:09:38:34 | GREAT! WE WILL PROCURE A NEW WINDOWS LAPTOP WITH A 15" SCREEN AND 6GB, AND WILL SHIP IT TO YOUR LOCATION TOMORROW. |

FIG. 6B

820 Number: INC0010004    State: New    Priority: 3-Medium

822

824  Submit

Admin
2020-02-22 07:35:05 comments · Translate    826

Please provide more detail on the exact issue

Léo
2020-02-22 07:34:45 comments · Translate    828

Mon ordinateur portable ne fonctionne pas, besoin d'aide

My laptop is not working, need help    830

Léo
2020-02-22 07:34:45 comments · Translate    832

INC0010004 Created

FIG. 8B

820 Number: INC0010004　　State: New　　Priority: 3-Medium

822

Léo
2020-02-22 07:35:40 comments · Translate　　834

Je pense que l'ordinateur portable s'allume parce que j'entends le ventilateur mais je ne vois rien sur l'écran > I think the laptop turns on because I hear the fan but I can't see anything on the screen　836

Admin　826
2020-02-22 07:35:05 comments · Translate

Please provide more detail on the exact issue

Léo　828
2020-02-22 07:34:49 comments · Translate

Mon ordinateur portable ne fonctionne pas, besoin d'aide

> My laptop is not working, need help　830

Léo　832
2020-02-22 07:34:45 comments · Translate

INC0010004 Created

Submit

ONLINE CHAT SESSION 1000 (WITHOUT TRANSLATION)

| |
|---|
| 1010 → Léo 2020-02-22 07:34:45 INC0010004 Créés |
| 1012 → Léo 2020-02-22 07:34:49 Mon ordinateur portable ne fonctionne pas, besoin d'aide |
| 1014 → Admin 2020-02-22 07:35:05 Please provide more detail on the exact issue |
| 1016 → Léo 2020-02-22 07:35:40 Je pense que l'ordinateur portable s'allume parce que j'entends le ventilateur mais je ne vois rien sur l'écran |
| 1018 → Admin 2020-02-22 07:35:56 (PRIVATE to Admin2) Any idea on how to address this issue? |
| 1020 → Admin2 2020-02-22 07:36:23 (PRIVATE to Admin) Have him plug the laptop into an external monitor. |
| 1022 → Admin 2020-02-22 07:36:44 Can you plug your laptop into an external monitor? |

INTERNAL TRANSCRIPT 1002 (WITH TRANSLATION TO ENGLISH)

| |
|---|
| Léo 2020-02-22 07:34:45 INC0010004 Created |
| Léo 2020-02-22 07:34:49 My laptop is not working, need help |
| Admin 2020-02-22 07:35:05 Please provide more detail on the exact issue |
| Léo 2020-02-22 07:35:40 I think the laptop turns on because I hear the fan but I can't see anything on the screen |
| Admin 2020-02-22 07:35:56 (PRIVATE to Admin2) Any idea on how to address this issue? |
| Admin2 2020-02-22 07:36:23 (PRIVATE to Admin) Have him plug the laptop into an external monitor. |
| Admin 2020-02-22 07:36:44 Can you plug your laptop into an external monitor? |

EXTERNAL TRANSCRIPT 1004 (WITH TRANSLATION TO FRENCH)

| |
|---|
| Léo 2020-02-22 07:34:45 INC0010004 Créés |
| Léo 2020-02-22 07:34:49 Mon ordinateur portable ne fonctionne pas, besoin d'aide |
| Admin 2020-02-22 07:35:05 Veuillez fournir plus de détails sur le problème exact |
| Léo 2020-02-22 07:35:40 Je pense que l'ordinateur portable s'allume parce que j'entends le ventilateur mais je ne vois rien sur l'écran |
| Admin 2020-02-22 07:36:44 Pouvez-vous brancher votre ordinateur portable sur un moniteur externe? |

FIG. 10

| Active Chat | 1200 | | INC0010004 | 1202 |

Messages will be automatically translated from French. You can click on the message to see the original. ← 1204

Léo: My laptop is not working, need help

Admin: Please provide more detail on the exact issue

Léo: I think the laptop turns on because I hear the fan but I can't see anything on the screen ← 1206

Number: INC0010004
Opened: 2020-02-22 07:34:45
Brief description: Laptop is not working
Caller: Léo
Priority: 5 – Planning
State: New
Category: Inquiry / help

FIG. 12

| Active Chat | 1300 | | INC0010004 | 1302 |
|---|---|---|---|---|
| VA | Hello! I am your virtual agent. Let me know how I can help you today. | Number | INC0010004 | |
| | | Opened | 2020-02-22 07:34:45 | |
| Léo | Problem with laptop | Brief description | Laptop is not working | |
| VA | No item matches your request. | Caller | Léo | |
| | | Priority | 5 – Planning | |
| Léo | Agent | State | New | |
| VA | I will transfer you to an agent who can help you. Please wait. | Category | Inquiry / help | |
| Admin | Hello, I understand that you have a computer problem. Can you describe it? | | | |
| Léo | My laptop is not working, need help | | | |
| Admin | Please provide more detail on the exact issue | | | |

Arrows: 1304 (VA), 1306 (Léo), 1308 (VA), 1310 (Léo), 1312 (VA), 1313 (Admin), 1314 (Léo), 1316 (Admin), 1318

FIG. 13

MACHINE TRANSLATION OF CHAT SESSIONS

CROSS-REFERENCE TO RELATED APPLICATIONS

This application is a continuation of and claims priority to U.S. patent application Ser. No. 17/153,144, filed Jan. 20, 2021, which is hereby incorporated by reference in its entirety.

U.S. patent application Ser. No. 17/153,144 is a continuation-in-part of and claims priority to U.S. patent application Ser. No. 16/820,473, filed Mar. 16, 2020, which is hereby incorporated by reference in its entirety.

BACKGROUND

Enterprises are increasing their global presence, with offices spread across different countries and continents. As a result, not all enterprise employees or customers may speak the same languages. Disparate languages become a barrier to operations when two or more employees cannot communicate with one another, or when an enterprise employee cannot communicate with a customer of the enterprise. Often this attempted communication takes place by way of graphical user interfaces within information technology tools, these tools including incident reporting, knowledge-base, or online chat applications.

SUMMARY

The embodiments herein provide graphical user interfaces that facilitate translation so that users who do not have any common language fluency can communicate with one another. In particular, these interfaces allow a user to specify a preferred language, and mechanisms to translate other languages appearing in the interfaces into the preferred language. The translation may involve either replacing the original text with the translated text, or positioning the translated text adjacent to or nearby the original text. Further, the user may be able to toggle whether the translated text is highlighted. This facilitates communication between users in different regions, countries or cultures without having to involve an individual who is multilingual. Additionally, dialogs between users can include these or other translation features to facilitate chat-like communication in real-time or near-real-time.

Accordingly, a first example embodiment may involve a database containing a plurality of items related to a software application, wherein a user profile specifies a preferred language, and wherein a particular item of the plurality of items includes text strings in the preferred language and in one or more other languages. The first example embodiment may also involve one or more processors configured to: generate, for display on a client device associated with the user profile, a graphical user interface containing (i) the text strings in the preferred language and in the other languages, (ii) a control for dynamic translation, and (iii) one or more text input controls, wherein the control for dynamic translation is deactivated, wherein a first set of the text strings in the other languages are displayed within the text input controls, and wherein a second set of the text strings in the other languages are not displayed within the text input controls; transmit, to the client device, a representation of the graphical user interface; receive, from the client device and by way of the graphical user interface, an indication that the control for dynamic translation has been activated; possibly in response to receiving the indication, cause the text strings in the other languages to be translated into the preferred language; generate, for display on the client device, an update to the graphical user interface, wherein the graphical user interface as updated includes translations of the first set of the text strings into the preferred language appearing adjacent to the first set of the text strings in the other languages, and wherein the graphical user interface as updated also includes translations of the second set of the text strings into the preferred language replacing the second set of the text strings in the other languages; and transmit, to the client device, a representation of the graphical user interface as updated.

A second example embodiment may involve retrieving, from a database, a particular item of a plurality of items related to a software application, wherein the particular item includes text strings in a preferred language and in one or more other languages. The second example embodiment may also involve generating, for display on a client device associated with a user profile that specifies the preferred language, a graphical user interface containing (i) the text strings in the preferred language and in the other languages, (ii) a control for dynamic translation, and (iii) one or more text input controls, wherein the control for dynamic translation is deactivated, wherein a first set of the text strings in the other languages are displayed within the text input controls, and wherein a second set of the text strings in the other languages are not displayed within the text input controls. The second example embodiment may also involve transmitting, to the client device, a representation of the graphical user interface. The second example embodiment may also involve receiving, from the client device and by way of the graphical user interface, an indication that the control for dynamic translation has been activated. The second example embodiment may also involve, possibly in response to receiving the indication, causing the text strings in the other languages to be translated into the preferred language. The second example embodiment may also involve generating, for display on the client device, an update to the graphical user interface, wherein the graphical user interface as updated includes translations of the first set of the text strings into the preferred language appearing adjacent to the first set of the text strings in the other languages, and wherein the graphical user interface as updated also includes translations of the second set of the text strings into the preferred language replacing the second set of the text strings in the other languages. The second example embodiment may also involve transmitting, to the client device, a representation of the graphical user interface as updated.

A third example embodiment may involve a database containing a first user profile that specifies a first preferred language of a first user and a second user profile that specifies a second preferred language of a second user. The third example embodiment may also involve one or more processors configured to: receive, from the first user and within a chat session hosted by the system, a first set of messages in the first preferred language; cause the first set of messages to be translated into the second preferred language; provide, to the second user and within the chat session, the first set of messages as translated into the second preferred language; receive, from the second user and within the chat session, a second set of messages in the second preferred language; cause the second set of messages to be translated into the first preferred language; provide, to the first user and within the chat session, the second set of messages as translated into the first preferred language;

store, in persistent storage accessible to the system, a first transcript of the chat session in which the first set of messages and the second set of messages are in the first preferred language; and store, in the persistent storage, a second transcript of the chat session in which the first set of messages and the second set of messages are in the second preferred language.

A fourth example embodiment may involve receiving, from a first user and within a chat session, a first set of messages in a first preferred language, wherein a database contains a first user profile that specifies the first preferred language is of the first user and a second user profile that specifies a second preferred language of a second user. The fourth example embodiment may also involve causing the first set of messages to be translated into the second preferred language. The fourth example embodiment may also involve providing, to the second user and within the chat session, the first set of messages as translated into the second preferred language. The fourth example embodiment may also involve receiving, from the second user and within the chat session, a second set of messages in the second preferred language. The fourth example embodiment may also involve causing the second set of messages to be translated into the first preferred language. The fourth example embodiment may also involve providing, to the first user and within the chat session, the second set of messages as translated into the first preferred language. The fourth example embodiment may also involve storing, in persistent storage, a first transcript of the chat session in which the first set of messages and the second set of messages are in the first preferred language. The fourth example embodiment may also involve storing, in the persistent storage, a second transcript of the chat session in which the first set of messages and the second set of messages are in the second preferred language.

In a fifth example embodiment, an article of manufacture may include a non-transitory computer-readable medium, having stored thereon program instructions that, upon execution by a computing system, cause the computing system to perform operations in accordance with the first, second, third, and/or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, and/or fourth example embodiment.

In a seventh example embodiment, a system may include various means for carrying out each of the operations of the first, second, third, and/or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4 depicts a communication environment involving a remote network management architecture, in accordance with example embodiments.

FIG. 6A depicts an incident report, in accordance with example embodiments.

FIG. 6B depicts on online chat, in accordance with example embodiments.

FIG. 8B also depicts a graphical user interface, in accordance with example embodiments.

FIG. 8D also depicts a graphical user interface, in accordance with example embodiments.

FIG. 10 depicts multiple transcripts of an online chat session, in accordance with example embodiments.

FIG. 12 depicts a banner indicating that an associated online chat session has been machine-translated from a source language, in accordance with example embodiments.

FIG. 13 depicts a transcript of an initial part of an online chat session, involving a virtual agent, being provided after handoff to a human agent, in accordance with example embodiments.

DETAILED DESCRIPTION

Figure 1:
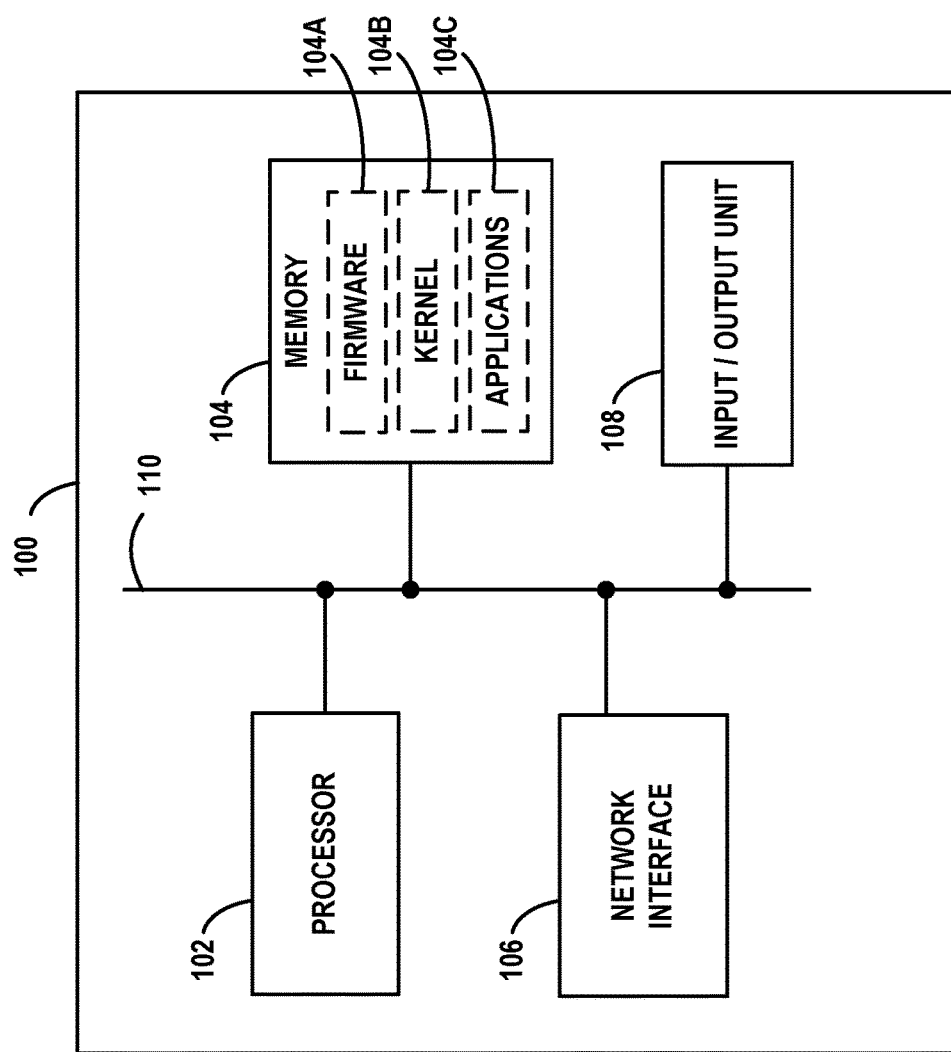
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
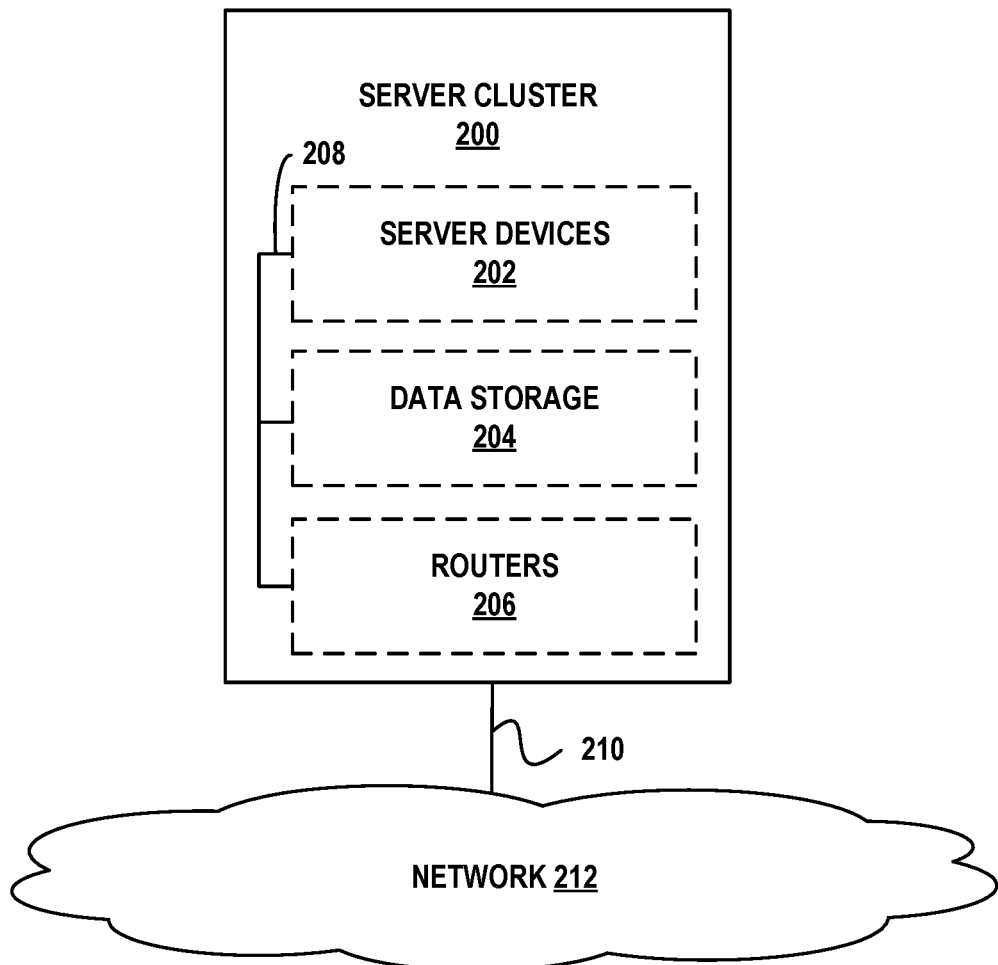
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
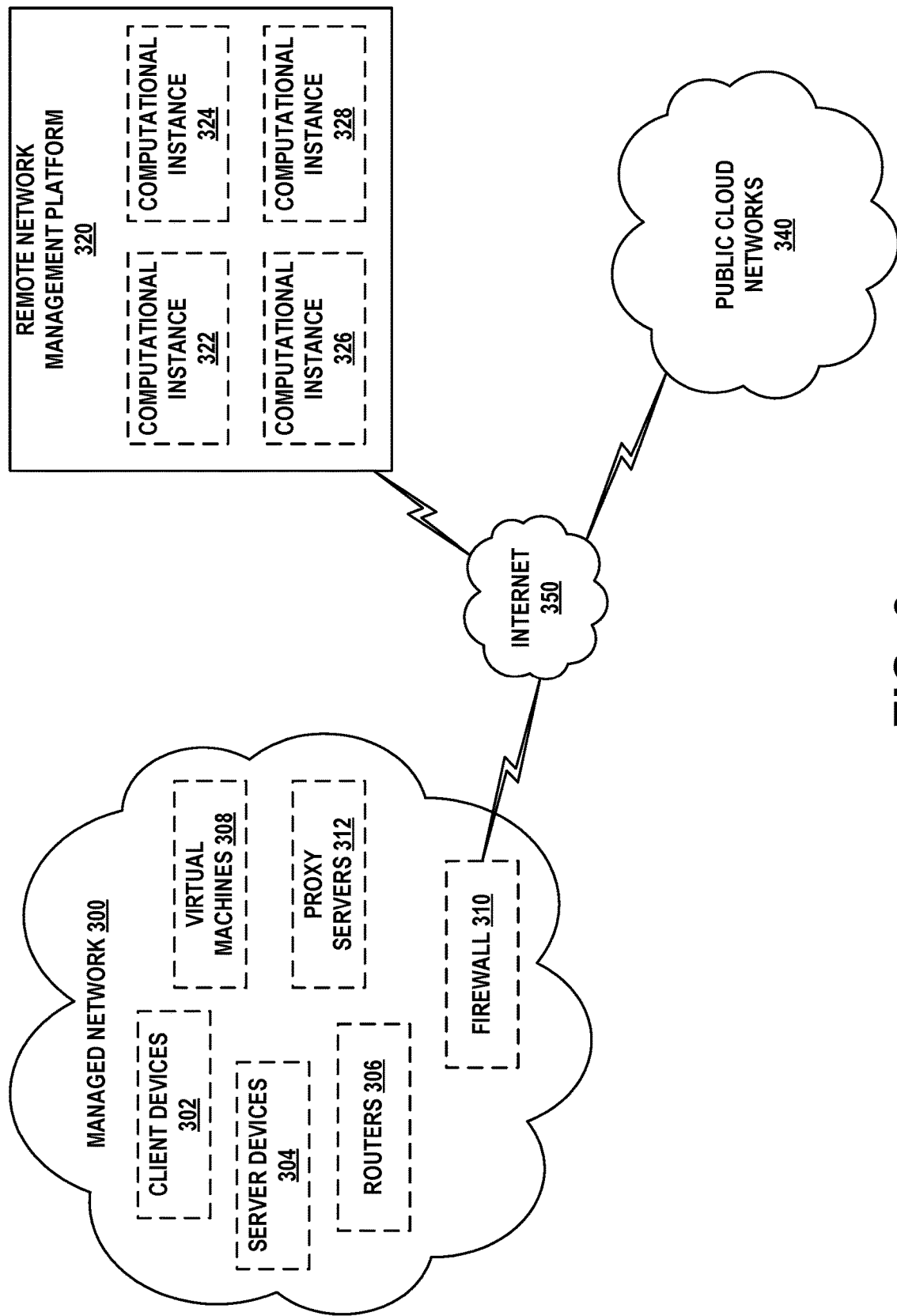
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
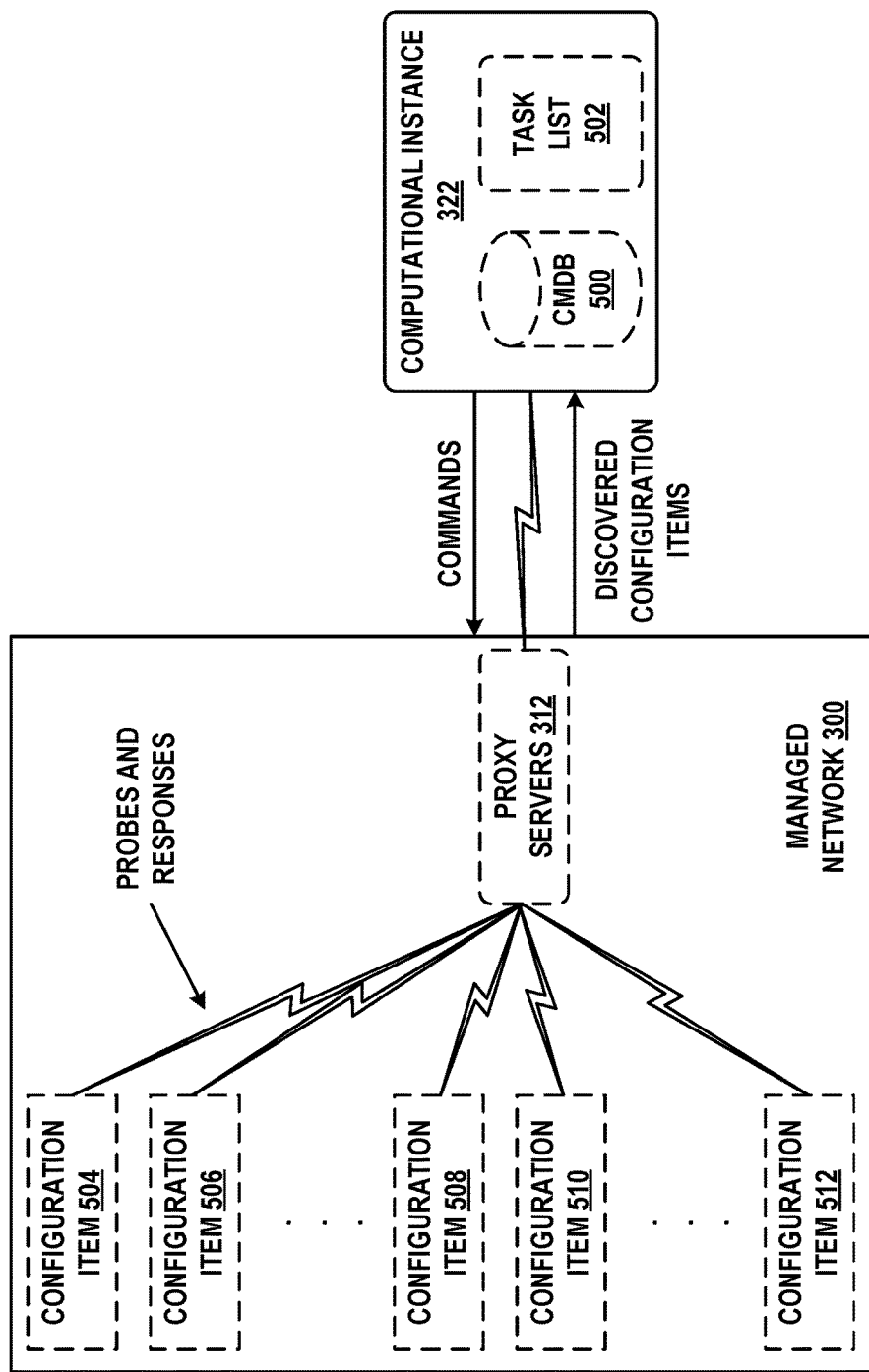
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
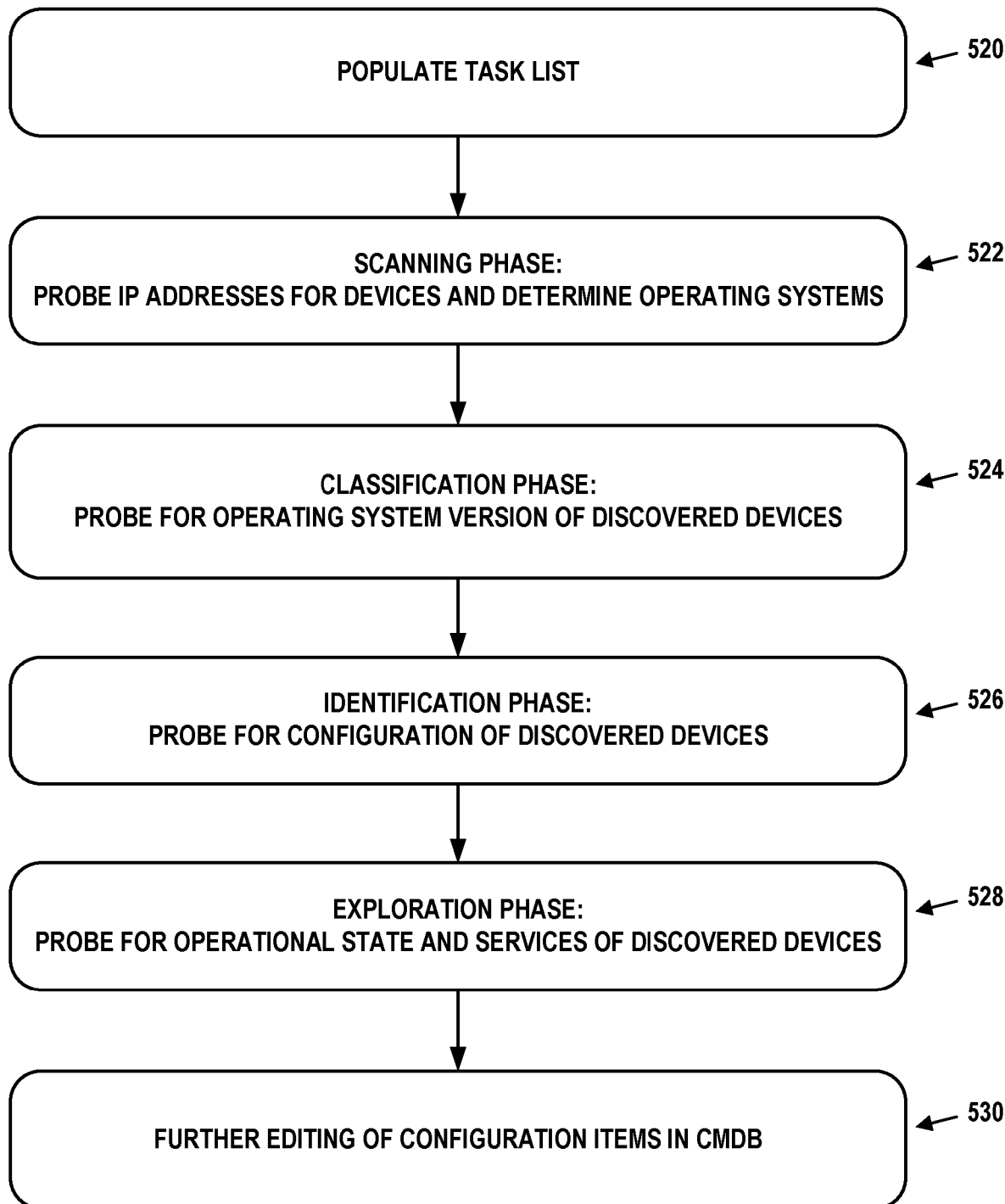
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. IT Applications with Translatable Information

As noted above, the expansion of enterprises has led to situations where enterprise employees, customers, and users in general may not all speak the same language. This can result in confusion, delays, and errors in operations as there may be a need for translation between native languages, and some of these translations may not be sufficiently accurate. In order to understand the scope of the problem, it is helpful to review types of applications that may be supported in an enterprise.

A remote network management platform may support multiple applications by way of graphical user interfaces presented to users of computational instances. Each of these applications may display textual information during its operation. This textual information may be a candidate for translation so that users who do not share a common language can still communicate. In this section, records from three types of applications are discussed: incident reports, online chat records, and knowledgebase articles. But the embodiments herein may apply to other types of IT records or non-IT records.

A. Incident Reports

Incident reports are often opened by IT users to describe a problem that they have experienced. Each incident report may also be referred to as a record. While incident reports may exist in various formats and contain various types of information, an example incident report 600 is shown in FIG. 6A. Incident report 600 consists of a number of fields in the left column, at least some of which are associated with values in the right column.

Field 602 identifies the originator of the incident, in this case Bob Smith. Field 604 identifies the time at which the incident was created, in this case 9:56 AM on Feb. 7, 2018. Field 605 is a text string that provides a short description of the problem. Field 606 is a description of the problem, as provided by the originator. Thus, field 606 may be a free-form text string containing anywhere from a few words to several sentences or more. Field 608 is a categorization of the incident, in this case email. This categorization may be provided by the originator, the IT personnel to whom the incident is assigned, or automatically based on the context of the problem description field.

Field 610 identifies the IT personnel to whom the incident is assigned (if applicable), in this case Alice Jones. Field 612 identifies the status of the incident. The status may be one of "open," "assigned," "working," or "resolved" for instance. Field 614 identifies how the incident was resolved (if applicable). This field may be filled out by the IT personnel to whom the incident is assigned or another individual. Field 616 identifies the time at which the incident was resolved, in this case 10:10 AM on Feb. 7, 2018. Field 618 specifies the closure code of the incident (if applicable) and can take on values such as "closed (permanently)", "closed (work around)", "closed (cannot reproduce)", etc. Field 620 identifies any additional notes added to the record, such as by the IT personnel to whom the incident is assigned. Field 622 identifies a link to an online article that may help users avoid having to address a similar issue in the future. Field 622 might not be filled out in all records.

Incident report 600 is presented for purposes of example. Other types of incident reports may be used, and these reports may contain more, fewer, and/or different fields. For example, a priority field may indicate the relative important and/or urgency of the problem described in the incident report.

Incident reports, such as incident report 600, may be created in various ways. For instance, by way of a web form, an email sent to a designated address, a voicemail box using speech-to-text conversion, and so on. These incident reports may be stored in an incident report database or table therein that can be queried. As an example, a query in the form of a text string could return one or more incident reports that contain the words in the text string.

B. Online Chat Records

Online chat systems are one-to-one, one-to-many, or many-to-many messaging applications that allow users to communicate with one another using text, audio, images, and/or video. One or more users may join a chat room, and messages that each user types into a text entry box may be transmitted to all users in the room. This allows information to be shared in a semi-real-time manner, more quickly and interactively than via email for example.

Enterprise IT departments may allow technology users to confer with IT personnel by way of online chat systems. Incoming chat requests may be queued for servicing by IT personnel when the latter become available. Once engaged, the chat session may involve back-and-forth messaging between the user and an agent. As these messages may be helpful for auditing purposes, as well as for identifying common types of IT problems, records of online chats may be stored in a database.

In some cases, enterprises may use virtual agents. A virtual agent is a program that simulates a live human agent by using pre-defined or dynamically generated messages arranged in a conversation flow that is intended to answer a user's question or solve a user's problem. In some cases, all incoming chat requests may be initially answered by virtual agents that will either address the user's request or hand off the chat to a human agent.

FIG. 6B depicts example online chat record 630. It consists of several messages between participants Alice and Bob. Bob might or might not be a virtual agent. Each message in online chat record 630 includes indications of the sender 632, the recipient 634, a timestamp 636 of when the message was sent, and the content 638 of the message.

Many online chat records may be stored in a database. This database may be queried to determine how IT personnel have addressed technology problems and requests in the past.

C. Knowledgebase Articles

Unlike incident reports and online chat records, both of which provide some indication of how a specific user's problem or request was resolved, knowledgebase articles are longer, pre-written guides or sets of instructions for addressing certain types of problems. Often, many users have the same technology problems over and over, such as how to reset their enterprise passwords or how to access Wifi networks in various locations. Thus, IT personnel may write knowledgebase articles that address these issues. These articles may take the form of flat files, hyperlinked files, database content, or combinations thereof.

In general, knowledgebase articles are longer, more detailed, and more pedagogical than the information in incident reports or online chat records. Therefore, they provide a way for users or IT personnel to quickly address common problems.

Figure 6C:
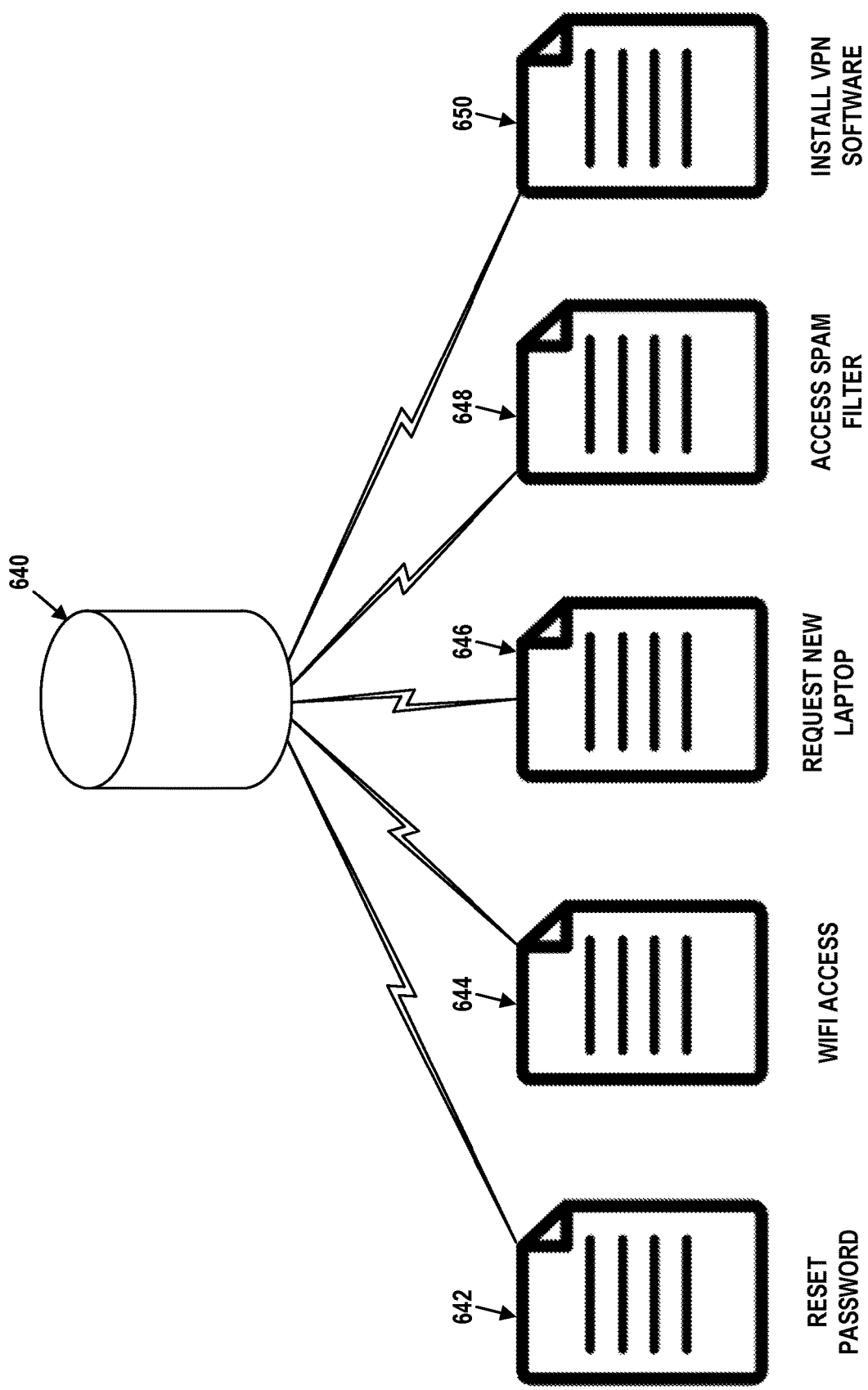
FIG. 6C depicts a set of knowledgebase articles, in accordance with example embodiments.

FIG. 6C depicts knowledgebase 640, which may be a database file server, or some other form of storage. Knowledgebase 640 contains five articles 642, 644, 646, 648, and 650, addressing password reset, Wifi access, new laptop requests, spam filter access, and VPN software installation, respectively. Other topics may be present.

VI. Example Graphical User Interfaces Facilitating Translation

For any of the applications described above, as well as other applications supported by a computational instance of a remote network management platform, translation can be facilitated by a number of distinct user interface capabilities. These capabilities may be implemented using program logic to generate user interfaces and variations thereof, and information may be stored in database records in order to save configurations and translations of application content.

Herein, the term "content" may be used to refer to what is being translated. This content may be textual in nature (e.g., ASCII or Unicode text), but also may include images with or without textual matter as well as other types of content. For example, images may be "translated" by replacing one with another, where the replacement image is in better accordance with the language and or culture to which translation is desired. Thus, translations are not limited to text even though the examples herein are text-oriented.

In a multi-language environment, each user of a computational instance may be able to select his or her preferred language. This is the language in which the user wishes to view content. Thus, for example, some users may select English as their preferred language, while others may select French, Spanish, Chinese, and so on. Nonetheless, other users may enter data into the computational instance in their own preferred languages. This can result in certain items within applications having data in multiple languages. Consequently, it may be difficult for any one user to make sense of the item as a whole.

Figure 7A:
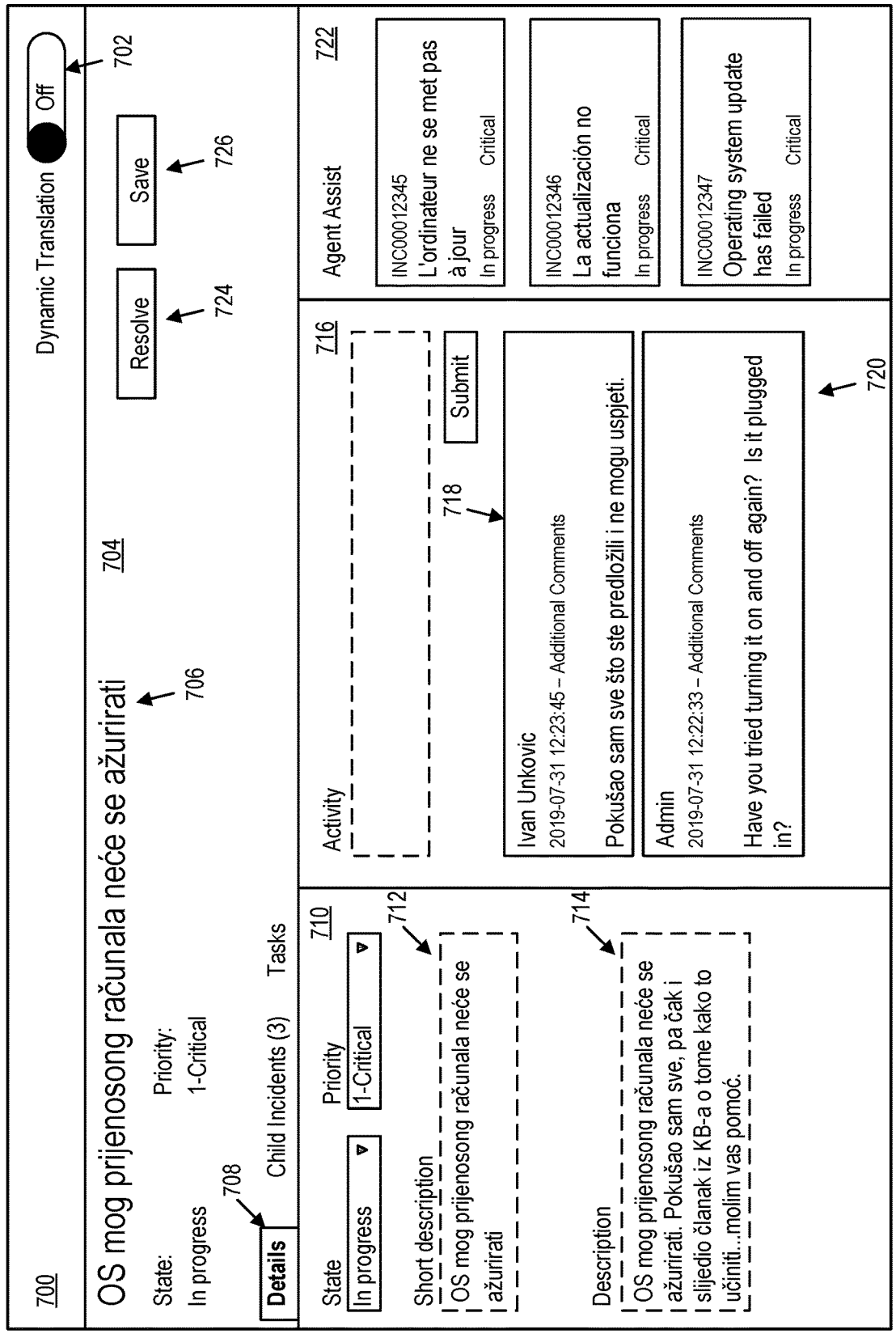
FIG. 7A depicts a graphical user interface, in accordance with example embodiments.

As an example, FIG. 7A depicts a graphical user interface for an incident report. This graphical user interface includes panes 700, 704, 710, 716, and 722, each containing a number of graphical and/or textual elements. Some of the textual elements are in different languages. Notably, the graphical user interface of FIG. 7A is shown for purposes of illustration, and other types of content and/or arrangements of content may be used without departing from the embodiments herein.

Throughout the discussion of FIGS. 7A, 7B, 7C, 7D, and 7E, it is assumed that the user's preferred language is English, and that non-English text appearing in the associated graphical user interfaces can be detected and translated to English. For example, a detection module may be able to determine the language of various units of content by considering the type of script (e.g., Latin, Cyrillic, Arabic, or Chinese), words present, and character patterns used within each unit of content. Further, the system may use an internal or external translation model or service (e.g., GOOGLE® Translate, IBM® Language Translator, or MICROSOFT® Translator) that is pre-trained for translating various input languages to various output languages.

A user or system administrator may select a particular external translation model or service for use with dynamic translation. In some embodiments, the computational instance may block certain types of personally identifying information (e.g., email addresses, postal addresses, phone numbers, government identifiers, and/or credit card numbers) from being transmitted to the selected external translation model or service.

Pane 700 includes dynamic translation button 702. This button is represented as a movable switch or toggle that can be used to turn off or on dynamic translation of content on the graphical user interfaces. In FIG. 7A, button 702 is set to "off", which indicates that dynamic translation of elements is not being shown. A user may select, actuate, or otherwise activate button 702 to turn dynamic translation on.

Pane 704 includes general information related to the incident report, including text 706 prominently displaying its short description (in Croatian), as well as a depiction of its state ("In progress") and priority ("1-Critical"). Pane 704 also includes actuatable buttons 724 and 726. These buttons may also be referred to as "controls" and might not always appear in the form of buttons. When actuated, button 724 changes the state of the incident report to "Resolved". When actuated, button 726 saves any changes made to the incident report. Pane 704 further includes selectable tabs that control what is displayed below pane 704. As shown, details tab 708 is selected, which causes panes 710, 716, and 722 to be displayed.

Pane 710 depicts the incident report's state and priority again, this time in drop down menus so that the current values can be changed. Pane 710 also includes editable versions of the incident report's short description and description (both in Croatian) in text input boxes 712 and 714, respectively. Notably, these text input boxes (which may also be referred to as "text input controls" and might not always appear as boxes) are depicted with dashed lines to indicate that the user can edit the text therein. Thus, any changes made to this text would be saved to database upon actuation of button 726.

Pane 716 includes an activity text box in which the user can enter activity taken regarding the incident report (currently this text box is empty), as well as a history of such activities. Activity record 718 includes text entered in Croatian, while activity record 720 includes text entered in English. Notably, the text in activity records 718 and 720 represent a dialog between users writing in Croatian and English presented in reverse chronological order.

Pane 722 includes brief summaries three other incident reports deemed to be possibly related to this incident report. In particular, an agent assist module may conduct a contextual search for additional incidents related to the displayed incident report. This may involve, in the case where multiple languages are represented in the incident database, translating at least parts of the incident reports into a common language and performing the contextual search on the translated incident reports. While one of these possibly related incidents is in English (INC00012347), another is in French (INC00012345) and yet another is in Spanish (INC00012346).

When a remote network management platform is deployed in multiple countries or regions, it is virtually inevitable that users will speak disparate languages. This implies that, in some situations, two or more users who communicate via an application will be unable to find a common language in which both have a reasonable degree of fluency. As a result, enterprise operations are likely to be slowed by this communication barrier, and misunderstandings and mistakes become more likely.

In order to address these and other issues, the embodiments herein facilitate dynamic translation from one or more source languages into a preferred language of a user. The procedures and outcomes of such translations are shown in FIGS. 7B-7E.

Figure 7B:
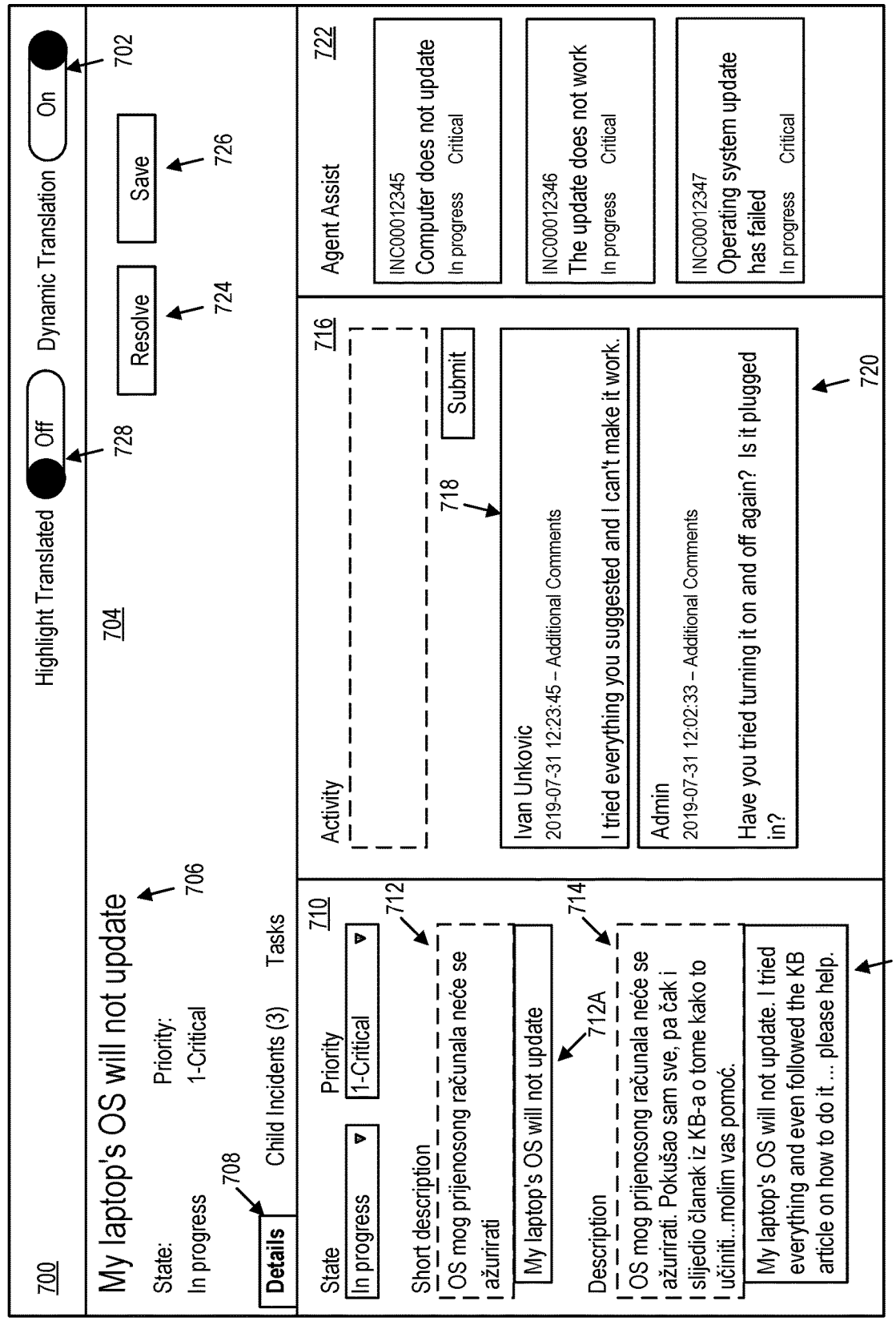
FIG. 7B also depicts a graphical user interface, in accordance with example embodiments.

FIG. 7B depicts the graphical user interface of FIG. 7A with button 702 actuated to the "On" position. Doing so causes dynamic translation of all non-preferred languages appearing in the graphical user interface into the preferred language. In these embodiments, it is assumed that the preferred language is English. Thus, the text in Croatian, French, and Spanish is translated to English.

In particular, text that is not appearing in a text input box is translated in place, with the translation to English replacing or overwriting the text in the non-preferred language. This is shown for text 706, activity records 718 and 720, and related incident reports of pane 722. On the other hand, the non-English text appearing in text input boxes 712 and 714 is kept in place while the English translations of these texts, text boxes 712A and 714A respectively, appear below their associated non-English texts.

Not translating the content of text input boxes 712 and 714 in place avoids the English translations accidentally being saved to database should the user actuate save button 726. Keeping a copy of the original, non-translated text as a "ground truth" source is beneficial, as not all translations will perfectly capture the nuances of the original text.

Thus, when translating a graphical user interface—such as the one depicted in FIG. 7A—into the preferred language, the computational instance may detect the language of each unit of text on the graphical user interface, and then for each unit of text not in the preferred language, translate that text to the preferred language. For units of text not in text input boxes (or that otherwise cannot be changed by the user), the computational instance replaces the original text with the associated translation on the graphical user interface. For units of text in the text input boxes, the computational instance creates a new text box, container, or user interface element with the translation positioned respectively adjacent to the original text. Alternatively, the computational instance may just display the translation positioned as such. Here, the term adjacent may mean immediately above, below to the left of, to the right of, or within a predetermined distance (e.g., in pixels, inches, or millimeters) of the original text.

Notably, the translation may be display-only, in that it is shown on the graphical user interface, but does not get written to database in a way that replaces the original, non-translated text. In some embodiments, however, the translated text may be stored in a cache (e.g., within the computational instance) for a period of time (e.g., minutes, hours, or days) so that cached translations can be used instead of submitting the non-translated text to a translation model or service. This saves computational power and helps provide common translations rapidly.

In FIG. 7B, highlight translated button 728 is also present. This button may appear when dynamic translation button 702 is set to "On", and may disappear when dynamic translation button 702 is set to "Off". Actuating highlight translated button 728 may result in translated text on the graphical user interface being highlighted or otherwise emphasized.

Figure 7C:
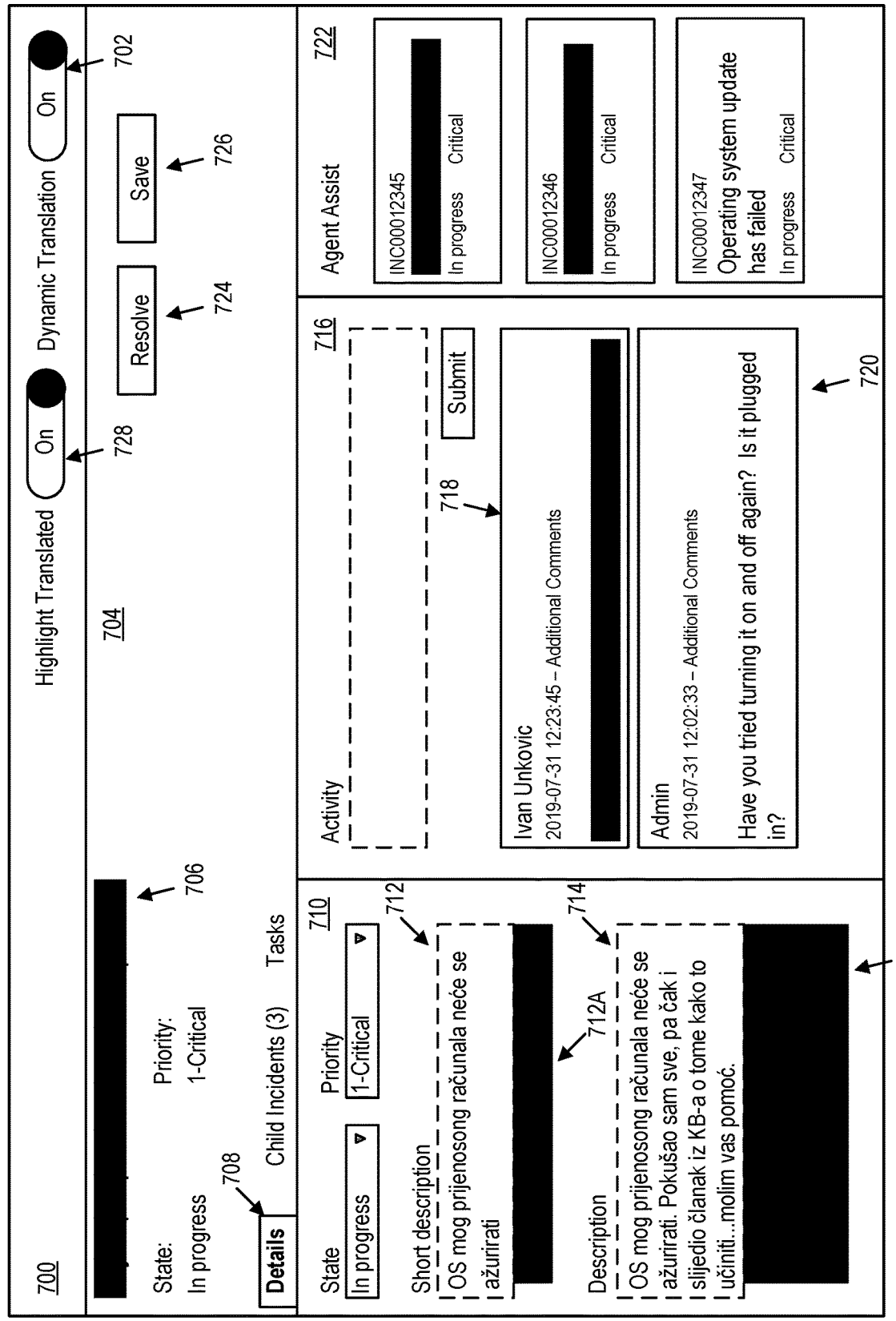
FIG. 7C also depicts a graphical user interface, in accordance with example embodiments.

Such highlighting is shown in FIG. 7C. Particularly, text 706, text box 712A, text box 714A, the user-entered text in in activity record 718, and the user-entered text in related incidents of pane 722 are all highlighted with a shaded background. In practice, this background shading may be yellow, red, green, or any color that helps emphasize the translated text. In alternative embodiments, the highlighting may make the text bold, italicized, underlined, or emphasized in some other fashion.

This highlighting feature is useful because it allows the user to rapidly determine which text has been translated to the preferred language (in this case, English). In situations where the text appearing on the graphical user interface is stilted, awkward, or hard to understand, the user can decide if these properties are due to possible translation errors, and the user can potentially obtain another translation of the original text (e.g., by copying and pasting the original text into a web-based translation model or service).

Figure 7D:
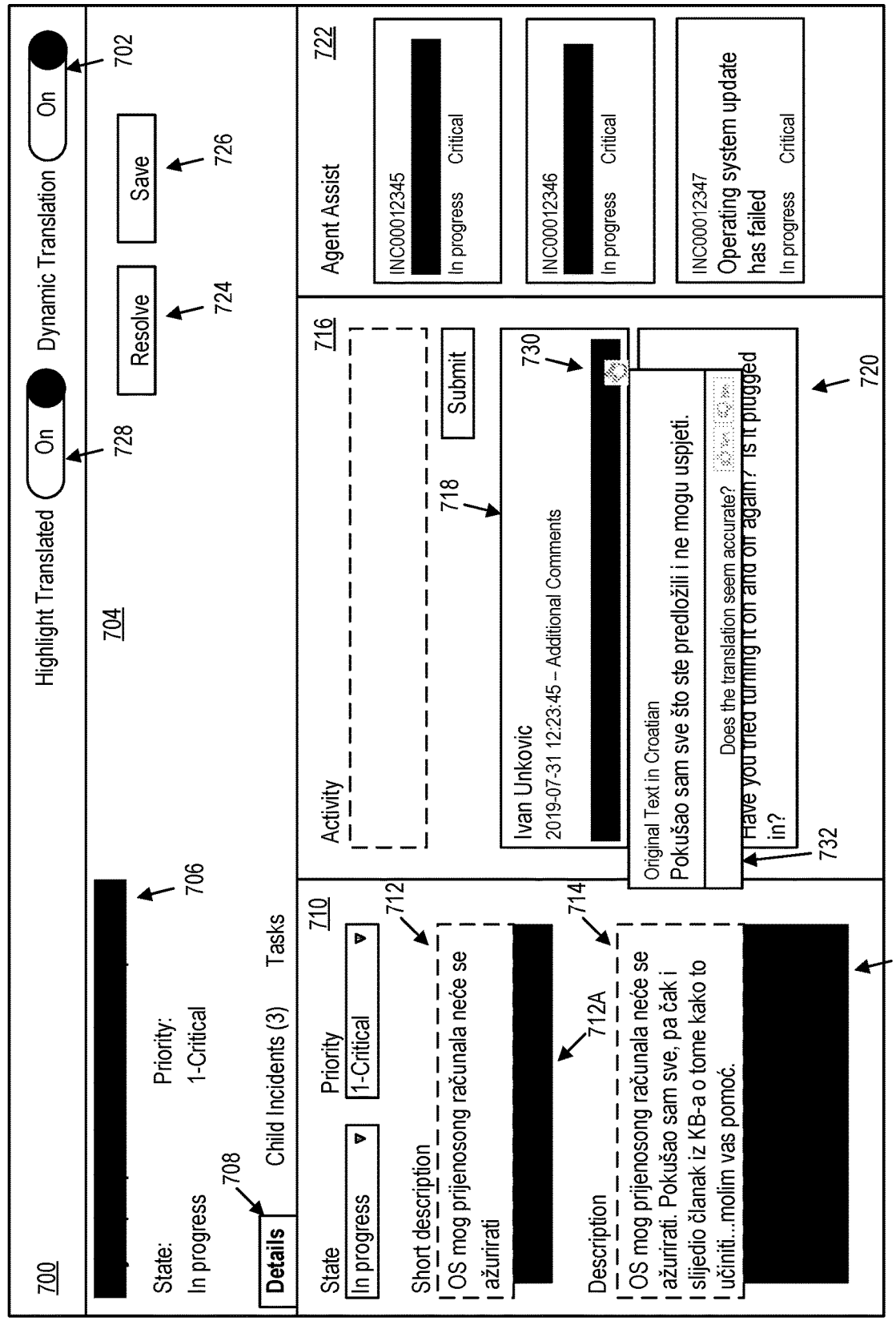
FIG. 7D also depicts a graphical user interface, in accordance with example embodiments.

In further embodiments, hovering a cursor or mouse pointer over translated text (highlighted or not) may cause a popup window to appear showing the non-translated version of the text. This is depicted in FIG. 7D, where mouse pointer 730 is hovering over the translation of the user-entered text in in activity record 718. Popup window 732 is displayed, showing the original, non-translated version of this text.

Additionally, popup window 732 includes a query asking the user, "Does the translation seem accurate?" This query is accompanied by two buttons allowing the user to answer "yes" or "no". In this way, popup window 732 allows bilingual users to provide feedback regarding the accuracy of the translation. In some embodiments, this feedback may be used to update and potentially improve the translation model or service.

Figure 7E:
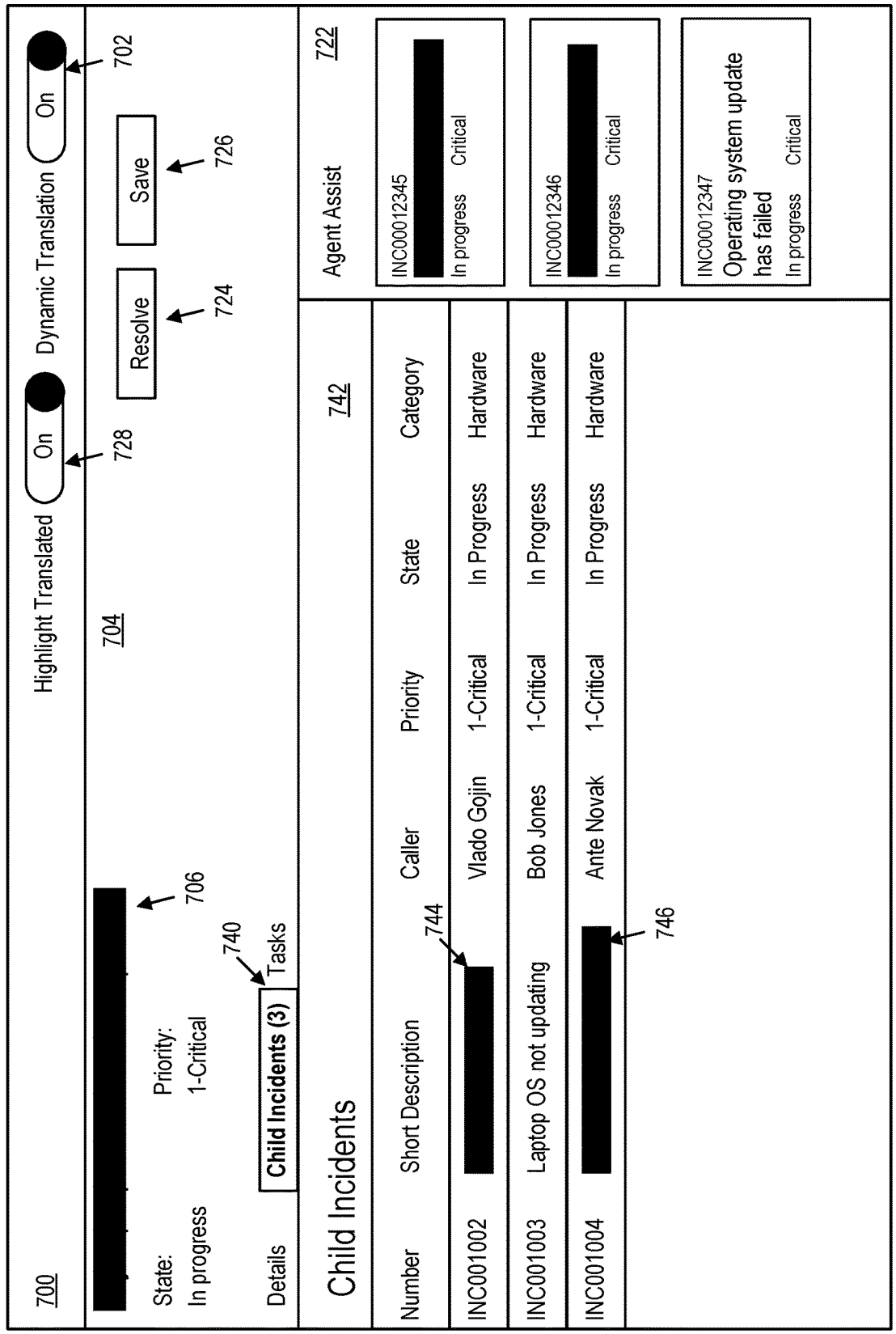
FIG. 7E also depicts a graphical user interface, in accordance with example embodiments.

FIG. 7E depicts the result of the user actuating child incidents tab 740. Panes 710 and 716 are replaced with pane 742. Pane 742 provides a list of further incident reports that have been marked as being related to the displayed incident report. Since dynamic translation button is still set to "On", the computational instance translates child incident text in non-preferred languages into the preferred language. As shown in FIG. 7E, this occurs for text 744 and text 746.

Since highlight translated button 728 is also set to "On", text 744 and text 746 are highlighted.

While FIGS. 7A-7E depict translation from non-preferred languages Croatian, French, and Spanish into the preferred language of English, other translations are possible. The embodiments herein facilitate translation from any one or more non-preferred language into any preferred language.

In various embodiments, other users of the graphical user interface may have different preferred languages, and the dynamic translation feature described above may adapt to these changes by translating other languages into these users preferred languages. For example, if a user has a preferred language of Croatian, the non-Croatian text shown in FIG. 7A may be translated to Croatian.

Further, a user may change his or her preferred language at any time and the computational instance may re-generate the graphical user interface accordingly. Thus, for example, if a user changes his or her preferred language from English to Spanish while the graphical user interface of FIG. 7B is displayed, the text that was originally in Spanish will be displayed while all other text may be translated into Spanish.

The following algorithm outlines how the above translation and highlighting may occur. Variations of this algorithm may exist in which features are omitted, additional features are added, or the features below are performed in a different order or combined in some fashion. The algorithm assumes that the graphical user interfaces herein are expressed HTML as web pages in the form of a document object model (DOM). The DOM is a tree or tree-like representation of a unit of a markup language (e.g., an XML, HTML, or JSON file). But other non-HTML and/or non-DOM representations may be used.

A first feature may involve loading an HTML page (representing a graphical user interface), obtaining therefrom the parent node of DOM, and parsing the page's HTML nodes recursively using until all the HTML elements have been considered. A second feature may involve creating a data structure to keep track of the HTML elements (in the current HTML page) in the form of key-value pairs. In this data structure, the key may be the HTML element, and the value may be the content inside that HTML element.

A third feature may involve detecting that the user has caused button 702 to be in the "On" position. This data structure is looped through and the content which is not in the user's preferred language is identified. A fourth feature may involve translating this content using an internal or external translation service as configured in the system.

A fifth feature may involve, when the translation is complete, adding a cascading style sheet (CSS) class attribute to the translated content indicating highlighting. If the field type of the HTML, node is editable (e.g., a text input box), the translated content is added adjacent to the original content. If the field type is non-editable, only the translated content is shown and the original content is hidden, but a link or button is added so that the user can cause the original content to be displayed.

A sixth feature may involve determining that a user has actuated button 728 to the "On" position. In response, the CSS style properties in the class attribute that was used for the translated content are updated so that the translated content is highlighted. A seventh feature may involve determining that a user has actuated button 728 to the "Off" position. In response, the CSS style properties that were added in the above class attribute are removed.

An eighth feature may involve a user actuating button 702 to be in the "Off" position. In response, the original content is displayed. When either button 702 or button 728 is actuated, this selection is activated across all the page navigations in the application by using event listeners.

FIGS. 8A-8D illustrate additional embodiments related to translation of a dialog between two or more users. These embodiments may be from an online chat session or from work notes attached to a representation of an incident, problem, issue, risk, etc. In various types of applications, it may be beneficial for users to exchange information. For example, an incident management application may support storing real-time or non-real-time chats between users about particular incidents. This might allow the users to come to a better understanding of the problem related to the incident and possible solutions.

Nonetheless, if these users do not speak the same language, such an understanding may be more difficult to obtain. Urgent issues may remain unaddressed until personnel with the appropriate language skills are available. But with the dynamic translations described herein, language is no longer a major barrier.

Figure 8A:
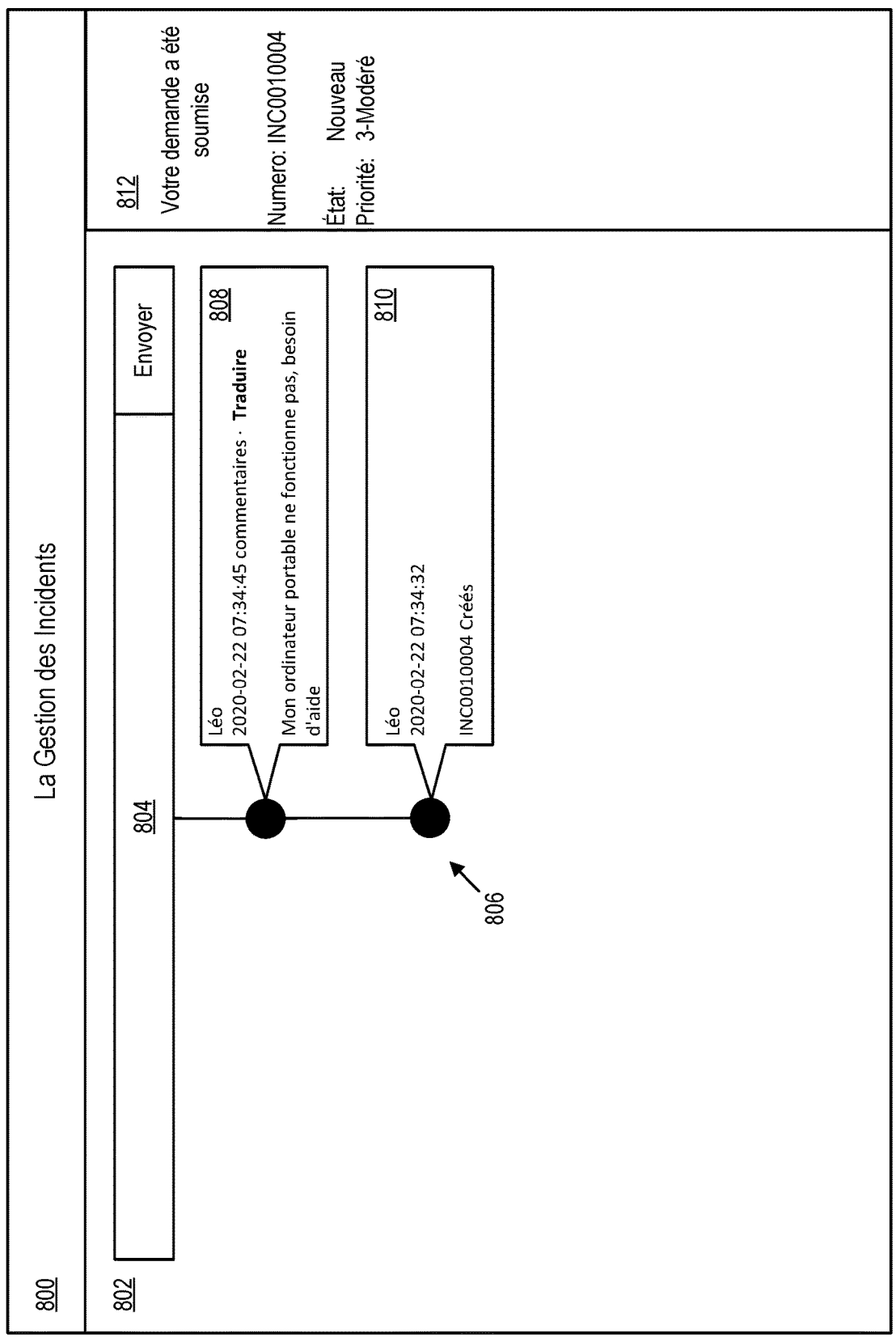
FIG. 8A also depicts a graphical user interface, in accordance with example embodiments.

FIG. 8A depicts a graphical user interface for a user with a preferred language of French who is experiencing a problem. This user may have created an incident report, and is in the process of describing the problem. The graphical user interface shown may be a partial interface that is coupled or combined with a more generic interface of the incident management application. Nonetheless, it includes panes 800, 802, and 812. Other arrangements of various types of information may be present in such a graphical user interface.

Pane 800 includes a title "La Gestion des Incidents", indicating that this interface related to incident management. Pane 802 includes diagram 806 representing comments entered regarding the present incident in reverse-chronological order. For instance, the user Léo may be able to enter text into text input control 804. This text then appears in diagram 806. For example, entry 810 represents the incident being created, and entry 808 represents Léo providing an initial description of the problem. Each entry with comments includes an actuatable element labelled "Traduire" which allows the user to translate the comments therein into the preferred language of French (since the comments entered so far are all in French, there is no need for translation yet). Pane 812 includes information identifying and/or describing the incident, such as its number, state, and priority.

FIG. 8B depicts a further graphical user interface that could be used by an administrator with a preferred language of English who has been tasked with resolving the incident. This graphical user interface may also be a partial interface that is coupled or combined with a more generic interface of the incident management application. Nonetheless, it includes panes 820 and 822. Other arrangements of various types of information may be present in such a graphical user interface.

Pane 820 includes information identifying and/or describing the incident, such as its number, state, and priority. Pane 822 includes represents comments entered regarding the present incident in reverse-chronological order. The administrator may be able to enter text into text input control 824. This text then appears in in the comments. For example, the two comments attributed to Léo are shown as entries 828 and 832, respectively. Each entry includes an actuatable element labelled "Translate" which allows the administrator to translate comments therein into the preferred language of English. For entry 828, such a translation of the comment therein has been obtained and is shown in element 830.

Given this translation, the administrator now understands the comment from Léo, and responds accordingly in English, as shown in entry 826.

Figure 8C:
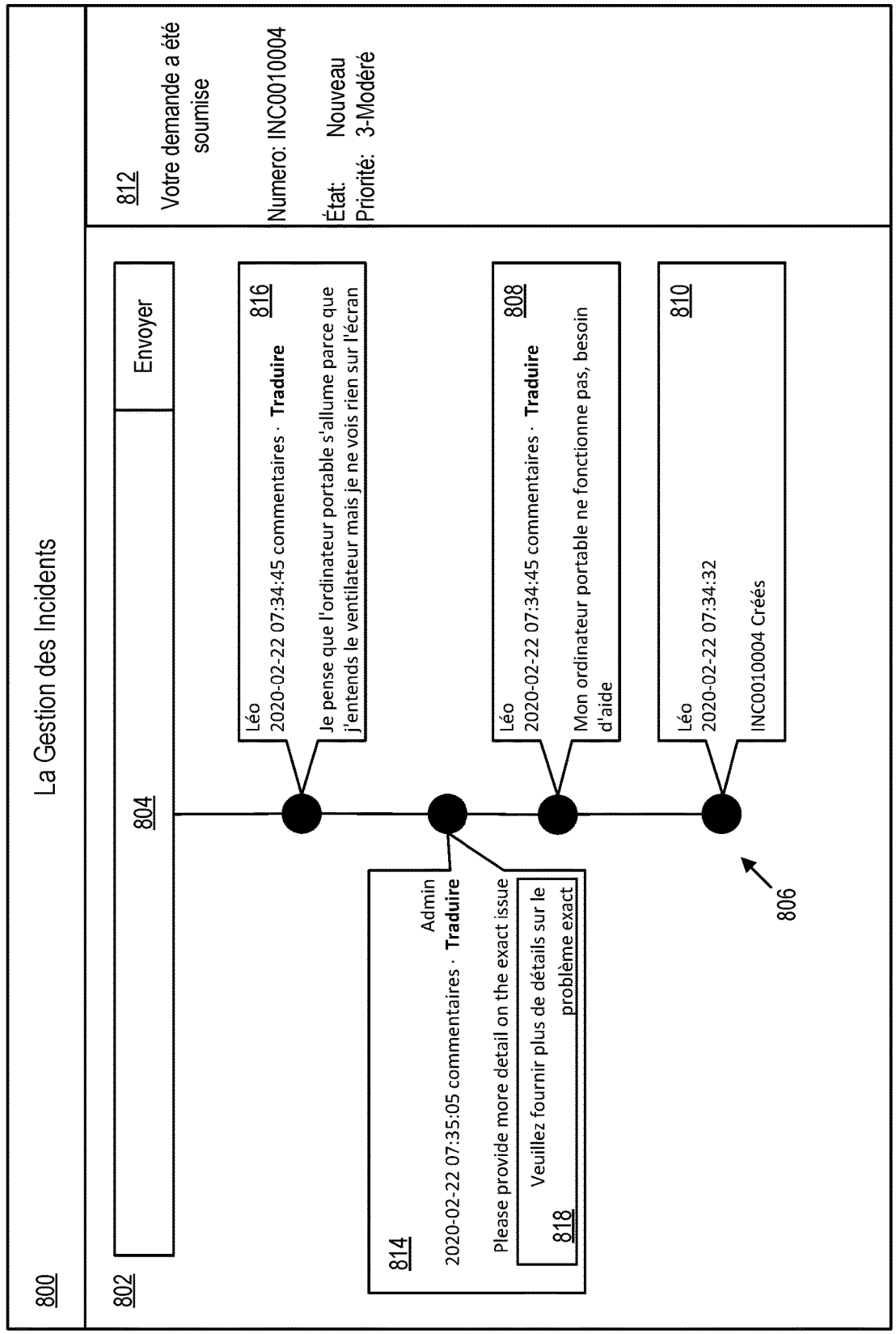
FIG. 8C also depicts a graphical user interface, in accordance with example embodiments.

FIG. 8C depicts the same graphical user interface as FIG. 8A, but with the administrator's comment appearing in entry 814. From this interface, Léo can actuate the "Traduire" button to translate the comment into French. This translation is shown in element 818. Further, entry 816 shown Léo's response.

FIG. 8D depicts the same graphical user interface as FIG. 8B, but with Léo's new comment (the response) shown in entry 834. From this interface, the administrator can actuate the "Translate" button to translate the comment into English. This translation is shown in element 836.

In this fashion, two or more users that do not share a common language can effectively communicate with one another. Additionally, a record of their communication, possibly including the translations, can be saved for future review. This mechanism allows a more flexible and rapid approach for addressing issues in real-time or near-real-time without having to locate and/or wait for an individual who is fluent in a particular language.

VII. Example Operations

Figure 9:
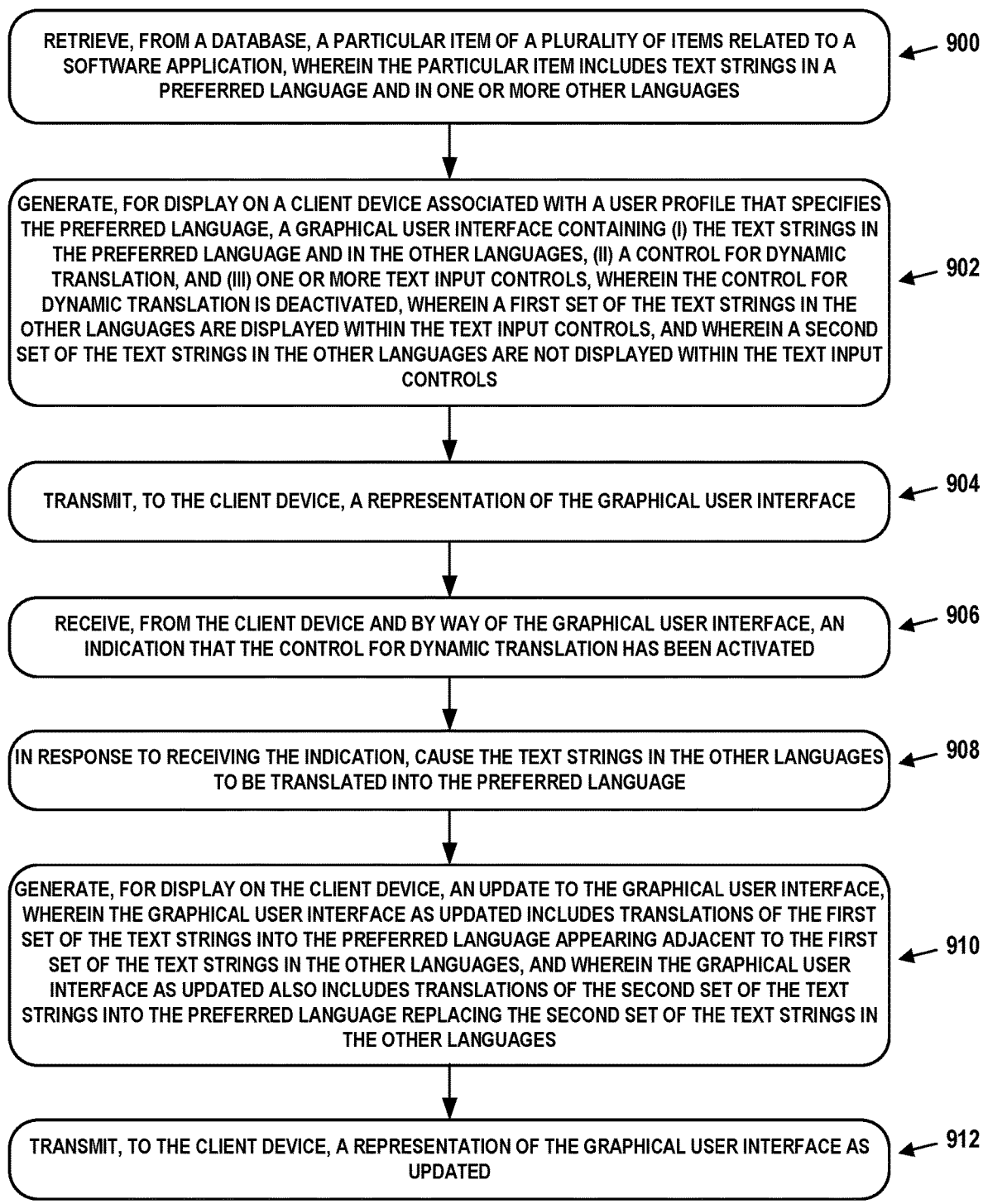
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve retrieving, from a database, a particular item of a plurality of items related to a software application, wherein the particular item includes text strings in a preferred language and in one or more other languages.

Block 902 may involve generating, for display on a client device associated with a user profile that specifies the preferred language, a graphical user interface containing (i) the text strings in the preferred language and in the other languages, (ii) a control for dynamic translation, and (iii) one or more text input controls, wherein the control for dynamic translation is deactivated, wherein a first set of the text strings in the other languages are displayed within the text input controls, and wherein a second set of the text strings in the other languages are not displayed within the text input controls.

Block 904 may involve transmitting, to the client device, a representation of the graphical user interface.

Block 906 may involve receiving, from the client device and by way of the graphical user interface, an indication that the control for dynamic translation has been activated.

Block 908 may involve, possibly in response to receiving the indication, causing the text strings in the other languages to be translated into the preferred language.

Block 910 may involve generating, for display on the client device, an update to the graphical user interface, wherein the graphical user interface as updated includes translations of the first set of the text strings into the preferred language appearing adjacent to the first set of the text strings in the other languages, and wherein the graphical user interface as updated also includes translations of the second set of the text strings into the preferred language replacing the second set of the text strings in the other languages.

Block 912 may involve transmitting, to the client device, a representation of the graphical user interface as updated.

In some embodiments, causing the text strings in the other languages to be translated into the preferred language involves detecting that the text strings in the other languages are in the other languages; providing, to a translation model or service, the text strings in the other languages with an instruction to translate the text strings in the other languages to the preferred language; and receiving, from the translation model or service, translations into the preferred language of the text strings in the other languages.

In some embodiments, the system stores the translations into the preferred language in a cache, wherein subsequent requests for translation of one or more of the text strings in the other languages are served by the translations into the preferred language stored in the cache.

In some embodiments, the software application is one of an incident management application with the items representing incidents, a chat application with the items representing chats, or a knowledgebase application with the items representing articles.

In some embodiments, the graphical user interface as updated does not change positions of the text strings in the preferred language.

In some embodiments, the graphical user interface also includes a control for highlighting, wherein the control for highlighting is deactivated. These embodiments may involve: receiving, from the client device and by way of the graphical user interface as updated, a further indication that the control for highlighting has been activated; possibly in response to receiving the further indication, generating, for display on the client device, a further update to the graphical user interface, wherein the graphical user interface as further updated highlights translations into the preferred language; and transmitting, to the client device, a representation of the graphical user interface as further updated.

In some embodiments, the highlights include changing, for the translations into the preferred language, a background color, a text color, or a font.

Some embodiments may further involve: receiving, from the client device and by way of the graphical user interface as further updated, an additional indication that a user-controlled pointer is within bounds of a particular translation of the translations into the preferred language; possibly in response to receiving the additional indication, generating, for display on the client device, an additional update to the graphical user interface, wherein the additional update to the graphical user interface includes a popup window overlaid onto the graphical user interface, wherein the popup window includes a particular text string in one of the other languages, and wherein the particular translation is a translation of the particular text string; and transmitting, to the client device, a representation of the graphical user interface as additionally updated.

In some embodiments, the popup window includes a first actuatable control and a second actuatable control, wherein receiving actuation of the first actuatable control indicates that a user finds the particular translation to be accurate, and wherein receiving actuation of the second actuatable control indicates that the user finds the particular translation to be inaccurate.

In some embodiments, the preferred language is not one of the other languages.

In some embodiments, a second user profile specifies a second preferred language. These embodiments may involve: generating, for display on a second client device associated with the second user profile, a second graphical user interface containing (i) the text strings in the preferred language and in the other languages, (ii) a second control for dynamic translation, and (iii) one or more further text input controls, wherein the second control for dynamic translation is deactivated, wherein a third set of the text strings are displayed within the further text input controls, and wherein a fourth set of the text strings are not displayed within the further text input controls; transmitting, to the second client device, a representation of the second graphical user interface; receiving, from the second client device and by way of the second graphical user interface, a second indication that the second control for dynamic translation has been activated; possibly in response to receiving the second indication, causing the text strings to be translated into the second preferred language; generating, for display on the second client device, an update to the second graphical user interface, wherein the second graphical user interface as updated includes translations of the third set of the text strings into the second preferred language appearing adjacent to the third set of the text strings, and wherein the second graphical user interface as updated also includes translations of the fourth set of the text strings into the second preferred language replacing the fourth set of the text strings; and transmitting, to the second client device, a representation of the second graphical user interface as updated.

In some embodiments, the second preferred language is one of the other languages.

VIII. Further Features Relating to Translation of Online Chat Sessions

One or more further features may be added to any of the embodiments described above. These features may also be combined with one another and are generally described in the context of online chat or work note transactions, such as those of FIGS. 8A-8D. For sake of simplicity, these transactions will be referred to as an "online chat session" or a "chat session" and may be associated with an online chat record. The online chat record may include one or more transcripts of messages that were exchanged between participants of the online chat session. Any feature described herein as applying to an online chat session might be applicable to the translation of work notes as well, in at least some scenarios.

A. Multiple Chat Transcripts with Private Messages

As noted, two or more online chat users who do not share a common language can effectively communicate with one another by way of live translation of chat messages. It can be beneficial to save transcripts of such a chat session, possibly one in each language that was involved in the translation. In the example of FIGS. 8A-8D, this means that the user Léo could later have access to a transcript in French, while the administrator would have access to a transcript in English.

The user's transcript may be referred to as an external transcript, while the administrator's transcript may be referred to as an internal transcript. If translations take place between more than two languages in a session, there may be more than two transcripts (e.g., one transcript per language).

Moreover, the online chat engine may support private messages between two or more administrators. For example, if one administrator asks another administrator for assistance, this request and the subsequent reply and/or conversation may take the form of private messages that only the administrators can view. Omitting users from private messages between administrators serves to reduce potential user confusion. Thus, when private messages are present in an online chat, they may only be written to internal transcripts and not to external transcripts. The chat user interface for an administrator may include an option or tab for transmitting such a private message.

An example is shown in FIG. 10. This example is an extension of the translated online chat of FIGS. 8A-8D. Online chat session 1000 contains messages 1010, 1012, 1014, 1016, 1018, 1020, and 1022 in descending order. Messages 1010, 1012, 1014, and 1016 correspond to messages 832, 828, 826, and 834, respectively. Messages 1018, 1020, and 1022 are new messages that do not appear in FIGS. 8A-8D. The messages as shown in online chat session 1000 are in their original languages, and none are translated (naturally, they will be translated as needed into the language of the intended recipient(s)).

Message 1018 involves the administrator (Admin) transmitting a private message to another administrator (Admin2), asking for help in addressing Léo's problem. Message 1020 involves Admin2 transmitting a private message to Admin with a suggestion. Message 1022 involves Admin transmitting a message in the online chat to Léo making this suggestion.

During or at some point after termination of the online chat session, internal and external transcripts may be stored—namely, as internal transcript 1002 and external transcript 1004. Notably, internal transcript 1002 contains all messages of online chat session 1000 (because it is an internal transcript) translated into English (the preferred language of Admin). On the other hand, external transcript 1004 omits private messages 1018 and 1020 (because it is an external transcript) and the messages therein are translated into French (the preferred language of Léo).

Both transcripts may be attached to or otherwise associated with an underlying record (e.g., INC0010004). Administrators, such as Admin and Admin2, may be able to access and review both transcripts. The user, Léo, may not be permitted to access the internal transcript. In fact, Léo may not even be made aware of its existence.

Maintaining transcripts of online chat sessions helps both users and administrators recall the discussions they had in these sessions. Doing so facilitates further debugging of the user's problem, or might help the administrators debug a similar problem in the future that another user is experiencing.

B. Translation of Record Data Incorporated into Online Chats

As shown in FIGS. 8A-8D as well as FIG. 10, a user can create or refer to an incident during an online chat session. The online chat session may be attached to or otherwise associated with that incident. In some embodiments, other types of non-incident record data, such as problems, issues, and so on could be created or referred to in an online chat session. Further, the online chat session itself may have its own record data, that of an interaction between an administrator and user.

In any event, the record data will almost always be entered in the originator's preferred language. For example, if the user Léo creates an incident, the incident will likely be in French. Thus, when an administrator who is not fluent in French attempts to review the data record, he or she will be unable to do so without manual translation. Likewise, an administrator could also create a data record (during or after an online chat session) in his or her preferred language (e.g., English), which may be difficult for the user to review without manual translation.

Regardless of which party creates the data record, it can be incorporated into online chat sessions in whole or in part. For example, the online chat user interface may have options to create the data record during the online chat session or to incorporate a previously-created data record. In either of these cases, the data records may be displayed to all users of the online chat session. But if it is in the preferred language of one user and the online chat session is using translation, the data record should be translated as well.

Figure 11:
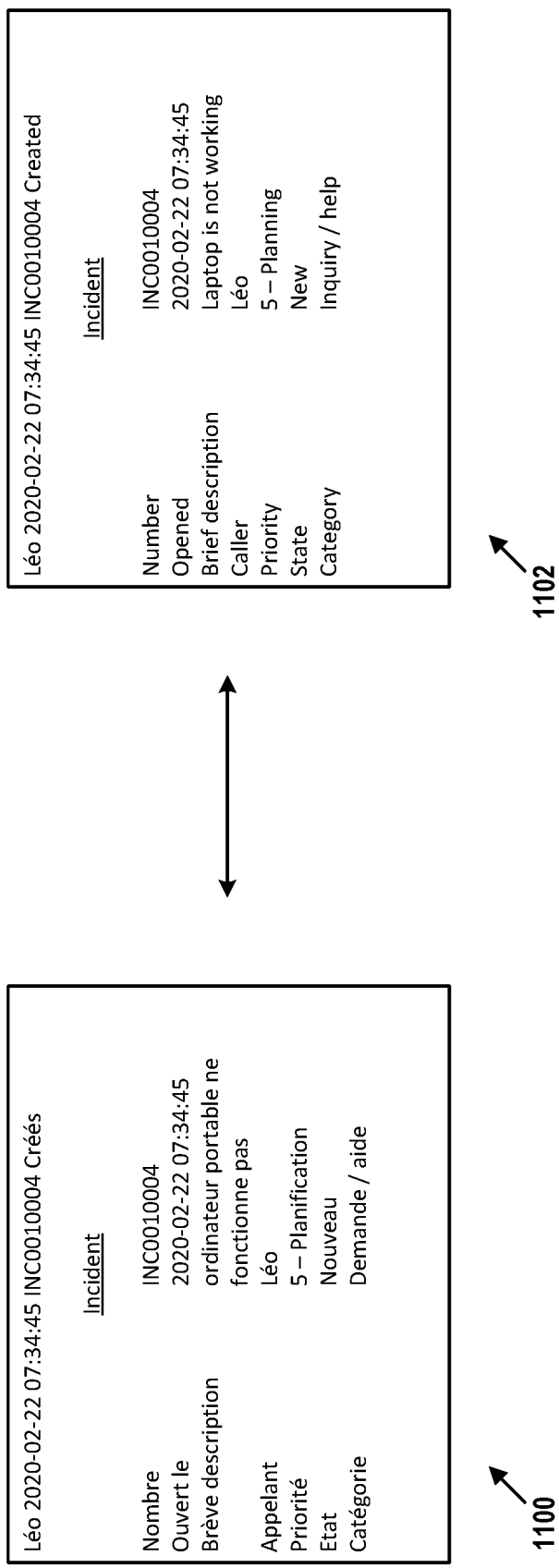
FIG. 11 depicts translation of a data record that is incorporated into an online chat session, in accordance with example embodiments.

Accordingly, the embodiments herein may include such translation. FIG. 11 is a logical depiction of such a translation relating to the online chat session depicted in FIGS. 8A-8D and FIG. 10. The data record is an incident created by the user Léo and incorporated into the online chat session. Thus, the data record is in French, and a portion thereof is shown in box 1100. When this data record is displayed to Léo in the online chat session, it is shown without translation. But when it is displayed to other's party in the online chat session, it is translated to that party's preferred language as needed. Thus, if the data record is displayed to a party with a preferred language of English (e.g., Admin), it may be translated as shown in box 1102.

This functionality improves the usefulness of online chat session translation. Participants in such a session would not have to manually translate the fields of a data record to determine its contents, saving valuable interaction time. Further, since the online chat session is translated, having untranslated text appear within it would make participants question whether the translation functionality is working properly.

C. Translation Banner during Online Chats

As online chat sessions may be translated, it can be helpful to indicate as such on the graphical user interface of the application that facilitates the session. For example, if an online chat session is being translated from French to a participant's preferred language of English, the graphical user interface might display a message or banner indicating that the original language is French. Further, the graphical user interface might indicate that this participant is viewing a machine translation from French to English. Likewise, if the online chat session is also being translated in the other direction from English to French, the graphical user interface might display a message or banner indicating that the original language is English to the other participant. Also, the graphical user interface might indicate that the other participant is viewing a machine translation from English to French.

Doing so serves at least two purposes. First, all participants in the online chat session are made aware that a machine translation is taking place, and may therefore proceed accordingly. For example, they may limit the number of idioms, colloquialisms, and other informalities that they enter into the online chat session. Moreover, they may understand that they need to be more tolerant of mistranslations, such as stilted grammar and improperly conjugated verbs. Second, if one of the participants is bilingual or multilingual and is fluent in another participant's preferred language, the bilingual or multilingual participant may start using this language directly, thereby eliminating the need for translation between these two participants.

FIG. 12 depicts a graphical user interface with such features. This graphical user interface is divided into two panes. On the left, pane 1200 includes an active online chat session between Léo and Admin. This session is similar to those shown before. Particularly, pane 1200 contains banner 1204 and messages 1206. Banner 1204 indicates to the viewing participant that "Messages will be automatically translated from French. You can click on the message to see the original." Thus, the viewing participant is made aware of the machine translation from the original language.

On the right, pane 1202 shows the associated incident. This incident could have been opened by either Léo or Admin. If the online chat session is not attached to an incident or other data record, pane 1202 may be blank or contain a description of the session itself.

D. Bulk Translation of Virtual Agent Chat for Handoff

In some embodiments, initial conversations in an online chat session may be between a human user and a virtual agent. Virtual agents are automated to mimic the behavior of a human agent through use of natural language processing, dialog trees, and/or machine learning techniques. Virtual agents may be able to obtain basic information about the human user and his or her concern, and may also be able to suggest solutions to simpler problems. Thus, the use of virtual agents can offload much of the burden related to at least initial stages of an online chat session from human agents. Virtual agent conversations may take place in the preferred language of the human user.

Nonetheless, virtual agents may not be able to solve certain problems, particularly complex issues. Also, some human users would prefer to confer with a human agent rather than a virtual agent. Therefore, either party (the human user or of the virtual agent) may be able to initiate a handoff from the virtual agent to a human agent. When such a handoff occurs, a transcript of the online chat session so far—between the human user and the virtual agent—may be made available to the human agent.

In some cases, this handoff may be to a human agent who is not fluent in the preferred language of the human user. Thus, the transcript so far should be translated to the preferred language of the human agent so that the human agent can understand the context of the session.

FIG. 13 depicts a graphical user interface including the translation of an online chat transcript being displayed after a handoff from a virtual agent to a human agent. This graphical user interface is divided into two panes. On the left, pane 1300 includes an active online chat session between Léo and Admin along with a transcript of a pre-handoff session between Léo and a virtual agent. Particularly, pane 1300 contains messages 1304, 1306, 1308, 1310, and 1312 between Léo and the virtual agent (originally in French), as well as messages 1314, 1316, and 1318 between Léo and the human agent (dynamically translated between French and English). All have been translated into English as needed, the preferred language of the human agent.

On the right, pane 1302 shows the associated incident. This incident could have been opened by either Léo or Admin. If the online chat session is not attached to an incident or other data record, pane 1302 may be blank or contain a description of the session itself.

E. Machine Translation Indicated in List of Stored Chats

As a result of supporting translation of online chat messages, some online chat sessions may include transcripts that were machine-translated. For example, when searching or browsing through stored records of online chat sessions, these sessions may be listed or identified on a graphical user interface in tabular format with columns for the fields of the session and each session appearing as an entry in a row. The columns may include, for instance, the session number, when the session was opened, the human agent to whom it was assigned, and whether machine translation was involved.

Indicating machine translation in such a list has a number of benefits. First, it allows users to readily determine whether an online chat session involved machine translation before even opening the session. Thus, the user may be prepared for occasional stilted grammar and improperly conjugated verbs in the transcript due to the translation. Second, it allows managers to determine the extent of machine translation that is taking place in online chat sessions. If this extent is high for certain languages (e.g., more than 25% of sessions involving French require machine translation), then a manager may decide that more human agents fluent in these languages should be hired.

F. Default Mapping of Language Codes

As noted above, the system may use an external translation model or service (e.g., GOOGLE® Translate, IBM® Language Translator, or MICROSOFT® Translator) that is pre-trained for translating various input languages to various output languages. To use these third-party services, the system may send a translation request to such a service. The request may include the text to translate, an indicator of a source language of the text, and an indicator of the target language to which the text is to be translated.

These indicators may be based on ISO 639-1 language identifiers, which take the form of two-letter codes (e.g., "en" for English, "fr" for French). Thus, for example, a request to translate the text "please reboot your computer" from English to French may take the form of a 3-tuple such as ("please reboot your computer", en, fr).

The third party services, however, may use their own custom variations of the ISO 639-1 language identifiers, or may use a completely different set of identifiers. Further, the system may have its own custom variation of the ISO 639-1 language identifiers that is different from any of the third parties.

Thus, the system may include one or more tables that map between the system's language identifiers and those of each of the external translation services. In this fashion, the system will be able to use its own representation of language identifiers internally, but map these language identifiers to those of a third-party service as needed. Notably, this may allow the system to transmit requests to the third-party services and to parse the corresponding replies in an unambiguous fashion.

IX. Further Example Operations

Figure 14:
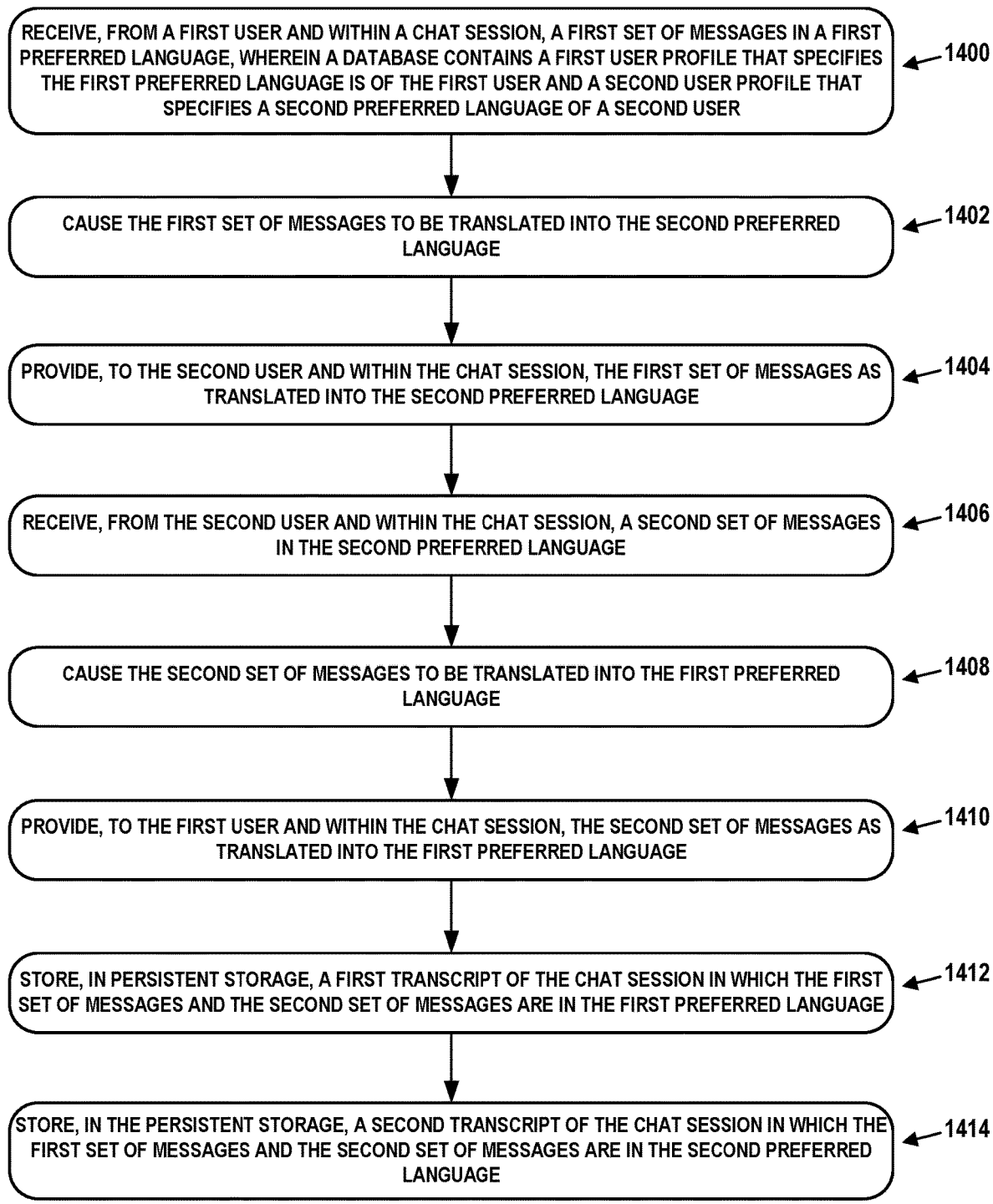
FIG. 14 is a flow chart, in accordance with example embodiments.

FIG. 14 is a flow chart illustrating an example embodiment. The process illustrated by FIG. 14 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 14 may be simplified by the removal of any one or more of the features shown therein. Further, these embodiments may be combined with features, aspects, and/or implementations of any of the previous figures or otherwise described herein.

Block 1400 may involve receiving, from a first user and within a chat session, a first set of messages in a first preferred language, wherein a database contains a first user profile that specifies the first preferred language is of the first user and a second user profile that specifies a second preferred language of a second user.

Block 1402 may involve causing the first set of messages to be translated into the second preferred language.

Block 1404 may involve providing, to the second user and within the chat session, the first set of messages as translated into the second preferred language.

Block 1406 may involve receiving, from the second user and within the chat session, a second set of messages in the second preferred language.

Block 1408 may involve causing the second set of messages to be translated into the first preferred language.

Block 1410 may involve providing, to the first user and within the chat session, the second set of messages as translated into the first preferred language.

Block 1412 may involve storing, in persistent storage, a first transcript of the chat session in which the first set of messages and the second set of messages are in the first preferred language; and Block 1414 may involve storing, in the persistent storage, a second transcript of the chat session in which the first set of messages and the second set of messages are in the second preferred language.

Some embodiments may involve receiving, from the second user and within a private messaging facility of the chat session, a third set of messages; providing, to a third user and within the private messaging facility, the third set of messages; receiving, from the third user and within the private messaging facility, a fourth set of messages; providing, to the second user and within the private messaging facility, the fourth set of messages, wherein the first transcript does not include the third set of messages and does not include the fourth set of messages, and wherein the second transcript includes the third set of messages and the fourth set of messages.

In some embodiments, the third set of messages and the fourth set of messages are in the second preferred language.

In some embodiments, the chat session is displayed, on a first graphical user interface and to the first user, in the first preferred language, wherein the first graphical user interface contains an indication that content of the chat session has been translated by machine from the second preferred language.

In some embodiments, the chat session is also displayed, on a second graphical user interface to the second user, in the second preferred language, wherein the second graphical user interface contains a further indication that the content of the chat session has been translated by machine from the first preferred language.

In some embodiments, the first user is an end-user or customer, and the second user is a human agent.

In some embodiments, an initial portion of the chat session was conducted between the first user and a virtual agent in the first preferred language, wherein the chat session was handed off from the virtual agent to the human agent, and wherein a graphical user interface displays, to the human agent, a transcript of messages from the initial portion of the chat session that are translated from the first preferred language to the second preferred language.

In some embodiments, the chat session is associated with a data record of an incident, issue, or problem.

In some embodiments, the data record is in the first preferred language. These embodiments may further involve: receiving, from the first user and within the chat session, a representation of the data record; causing the data record to be translated into the second preferred language; and providing, to the second user and within the chat session, the data record as translated into the second preferred language.

In some embodiments, the data record is in the second preferred language. These embodiments may further involve: receiving, from the second user and within the chat session, a representation of the data record; causing the data record to be translated into the first preferred language; and providing, to the first user and within the chat session, the data record as translated into the first preferred language.

Some embodiments may involve: generating a graphical user interface representing a plurality of chat sessions in a list, wherein the chat session is in the list, and wherein the graphical user interface indicates whether each of the plurality of chat sessions involved machine translation; and providing, to the second user, a representation of the graphical user interface.

In some embodiments, causing the first set of messages and the second set of messages to be translated comprises: providing, to a translation model or service, the first set of messages and the second set of messages with indicators of their respective original languages and their respective target languages; and receiving, from the translation model or service, translations of the first set of messages and the second set of messages into their respective target languages.

In some embodiments, the system represents languages with a first set of indicators and a translation model or service used for translations represents languages with a second set of indicators, and wherein the system includes a table that maps between the first set of indicators and the second set of indicators for corresponding languages.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   conducting, by a computing system, a chat session between a human user and a virtual agent, wherein the chat session is conducted in a first language;
   determining, by the computing system, that the human user or the virtual agent has initiated a hand off of the chat session from the virtual agent to a human agent;
   in response to determining that the human user or the virtual agent has initiated the hand off of the chat session, translating, by the computing system, a transcript of the chat session from the first language to a second language, wherein the second language is associated with the human agent; and
   providing, by the computing system, the transcript of the chat session in the second language to the human agent.

2. The method of claim 1, wherein the first language is a preferred language of the human user, and wherein the second language is a preferred language of the human agent.

3. The method of claim 1, wherein the transcript of the chat session is stored in the first language prior to the hand off.

4. The method of claim 1, further comprising:
   after providing the transcript of the chat session in the second language to the human agent, continuing the chat session between the human user and the human agent with translations between the first language and the second language.

5. The method of claim 4, wherein continuing the chat session between the human user and the human agent comprises:
   providing, for display to the human agent, a representation of a graphical user interface including: the transcript of the chat session between the human user and the virtual agent in the second language, and dynamic translations of messages from the human agent into the second language.

6. The method of claim 1, further comprising:
   facilitating, as part of the chat session between the human user and the human agent, a private messaging exchange between the human agent and a second human agent; and
   storing a first transcript of the chat session without the private messaging exchange and a second transcript of the chat session with the private messaging exchange, wherein the first transcript is accessible to the human user, and wherein the second transcript is not accessible to the human user.

7. The method of claim 6, wherein the private messaging exchange is not provided to the human user in the chat session.

8. The method of claim 6, wherein the first transcript is in the first language, and wherein the second transcript is in the second language.

9. A method comprising:
   conducting, by a computing system, a chat session between a user and a first agent;
   facilitating, by the computing system and as part of the chat session, a private messaging exchange between the first agent and a second agent; and
   storing, by the computing system, a first transcript of the chat session without the private messaging exchange and a second transcript of the chat session with the private messaging exchange, wherein the first transcript is accessible to the user, and wherein the second transcript is not accessible to the user.

10. The method of claim 9, wherein the private messaging exchange is not provided to the user.

11. The method of claim 9, wherein the first transcript and the second transcript are in different languages.

12. The method of claim 9, wherein the first agent and the second agent are human agents, the method further comprising prior to conducting the chat session between the user and the first agent:
    conducting the chat session between the user and a virtual agent, wherein the chat session is conducted in a first language;
    determining to hand off the chat session from the virtual agent to the first agent;
    in response to determining to hand off the chat session, translating an initial transcript of the chat session from the first language to a second language, wherein the second language is associated with the first agent; and
    providing the initial transcript of the chat session in the second language to the first agent.

13. The method of claim 12, wherein the first language is a preferred language of the user, and wherein the second language is a preferred language of the first agent.

14. The method of claim 12, wherein the initial transcript of the chat session is stored in the first language prior to the hand off.

15. The method of claim 12, where the chat session between the user and the first agent is conducted with translations between the first language and the second language.

16. The method of claim 15, wherein conducting the chat session between the user and the first agent comprises:
    providing, for display to the first agent, a representation of a graphical user interface including: the initial transcript of the chat session between the user and the virtual agent in the second language, and dynamic translations of messages from the user into the second language.

17. A non-transitory computer-readable medium storing program instructions that, when executed by one or more processors of a computing system, cause the computing system to perform operations comprising:
    conducting a chat session between a human user and a virtual agent, wherein the chat session is conducted in a first language;
    determining that the human user or the virtual agent has initiated a hand off of the chat session from the virtual agent to a human agent;
    in response to determining that the human user or the virtual agent has initiated the hand off of the chat session, translating a transcript of the chat session from the first language to a second language, wherein the second language is associated with the human agent; and
    providing the transcript of the chat session in the second language to the human agent.

18. The non-transitory computer-readable medium of claim 17, wherein the operations further comprise:
    after providing the transcript of the chat session in the second language to the human agent, continuing the chat session between the human user and the human agent with translations between the first language and the second language.

19. The non-transitory computer-readable medium of claim 18, wherein continuing the chat session between the human user and the human agent comprises:
    providing, for display to the human agent, a representation of a graphical user interface including: the transcript of the chat session between the human user and the virtual agent in the second language, and dynamic translations of messages from the human agent into the second language.

20. The non-transitory computer-readable medium of claim 17, wherein the operations further comprise:
facilitating, as part of the chat session between the human user and the human agent, a private messaging exchange between the human agent and a second human agent; and
storing a first transcript of the chat session without the private messaging exchange and a second transcript of the chat session with the private messaging exchange, wherein the first transcript is accessible to the human user, and wherein the second transcript is not accessible to the human user.

* * * * *